(12) United States Patent
Murakami

(10) Patent No.: US 6,317,409 B1
(45) Date of Patent: Nov. 13, 2001

(54) RESIDUE DIVISION MULTIPLEXING SYSTEM AND APPARATUS FOR DISCRETE-TIME SIGNALS

(76) Inventor: Hideo Murakami, 4-6-15 Ishibiki, Kanazawa, Ishikawa (JP), 920

( * ) Notice: Subject to any disclaimer, the term of this patent is extended or adjusted under 35 U.S.C. 154(b) by 0 days.

(21) Appl. No.: 09/016,278

(22) Filed: Jan. 30, 1998

(30) Foreign Application Priority Data

Jan. 31, 1997 (JP) .................................................. 9-018335

(51) Int. Cl.[7] ................. H04J 9/00; H04J 1/00; H03D 1/00
(52) U.S. Cl. ..................... 370/203; 370/480; 375/340
(58) Field of Search .................................. 370/203, 206, 370/208, 210, 211, 328, 335, 343, 344, 464, 480, 535; 375/295, 316, 340

(56) References Cited

U.S. PATENT DOCUMENTS 3,808,412 * 4/1974 Smith ................................... 708/316
4,365,110 * 12/1982 Lee et al. ............................. 380/28

(List continued on next page.)

OTHER PUBLICATIONS

Murakami, Hideo, *Residue Division Multiplexing for Discrete–Time Signals*, Dec. 19, 1997.

(List continued on next page.)

Primary Examiner—Huy D. Vu
Assistant Examiner—Kevin C. Harper
(74) Attorney, Agent, or Firm—Rabin & Berdo, P.C.

(57) ABSTRACT

A multiplexing system utilizes the whole transmission bandwidth without inducing interchannel interference for a linear channel with additive noise. Using the multiplexing system, the linear distortion channel is decomposed into independent linear distortion subchannels. Treating z-transforms as polynomials, a multiplexer at a receiver utilizes the Chinese remainder procedure to combine subchannel signals into a multiplexed signal to be transmitted through a single transmission channel. A demultiplexer at a receiver recovers the transmitted subchannel signals by taking residue polynomials on the factor polynomials used in the Chinese remainder procedure. The multiplexer that combines M subchannel signals of length K may be implemented by K M-point IFFT processors using $1-e^{j2\pi m/M}z^{-K}$ (m=0 to M−1) as relatively prime polynomials required in the Chinese remainder procedure. Samples from the subchannel signals are arranged in K groups of M samples such that each group contains samples at the same position in the subchannel signals, M-point inverse DFTs of the arranged samples are computed for all of the groups, and finally the multiplexed signal is obtained by performing polyphase composition of the inverse DFT outputs. Reversing the process of multiplexing, the demultiplexer is implemented by K M-point FFT processors. Another class of the system is a multiplexing system using $(1-e^{j2\pi m/M}r_0z^{-1})$ $(1-e^{j2\pi m/M}r_1z^{-1})$ ... $(1-e^{j2\pi m/M}r_{K-1}z^{-1})$ (m=0 to M−1) as relatively prime polynomials, wherein $r_i$ is a non-zero complex number (i=0 to K−1). The multiplexer obtains the multiplexed signal by applying the Chinese remainder procedure recursively, starting with the subchannel signals $X_m(z)$ regarding them as residue polynomials on $\mod((1-e^{j2\pi m/M}r_0z^{-1})$ $(1-e^{j2\pi m/M}r_1z^{-1})$ ... $(1-e^{j2\pi m/M}r_{K-1}z^{-1}))$ (m=0 to M−1).

42 Claims, 11 Drawing Sheets

U.S. PATENT DOCUMENTS

| | | | |
|---|---|---|---|
| 4,412,325 | * 10/1983 | Molo | 370/210 |
| 5,128,964 | 7/1992 | Mallory | 375/261 |
| 5,299,192 | * 3/1994 | Guo et al. | 370/210 |
| 5,657,313 | 8/1997 | Takashi et al. | 370/491 |
| 5,663,896 | 9/1997 | Aucsmith | 713/201 |
| 5,687,165 | 11/1997 | Daffara et al. | 370/208 |
| 5,712,800 | 1/1998 | Aucsmith | 713/201 |
| 5,926,455 | * 6/1999 | Allpress | 370/210 |

OTHER PUBLICATIONS

Murakami, Hideo, *Sampling Rate Conversion Systems Using a New Generalized Form of the Discrete Fourier Transform*, IEEE Transactions on Signal Processing, vol. 43, No. 9, pp. 2095–2102, Sep. 1995.

Bingham, John A.C., *Multicarrier Modulation for Data Transmission: An Idea Whose Time Has Come*, IEEE Communications Magazine, pp. 5–8, and 11–14, May 1990.

Agarwal, Ramesh C. and Burrus, Sidney C., *Number Theoretic Transforms to Implement Fast Digital Convolution*, Proceedings of the IEEE, vol. 63, No. 4, pp. 550–560, Apr. 1975.

* cited by examiner

RESIDUE DIVISION MULTIPLEXING SYSTEM AND APPARATUS FOR DISCRETE-TIME SIGNALS

BACKGROUND OF THE INVENTION

1. Field of the Invention

This invention relates to a multiplexing system and multiplexing and demultiplexing apparatuses for telecommunication, capable of transmitting a number of parallel signals (hereinafter referred to as subchannel signals) through a single transmission channel. The multiplexing system, more particularly, includes the multiplexing apparatus that converts subchannel signals into a single signal (hereinafter referred to as a multiplexed signal) at a transmitter, and a demultiplexing apparatus that recovers the subchannel signals from the received multiplexed signal at a receiver.

2. Description of Related Art

Frequency division multiplexing (FDM) and time division multiplexing (TDM) represent conventional primary multiplexing techniques for dividing a single transmission channel into a number of virtual subchannels. The TDM is a multiplexing system that assigns samples of subchannel signals into nonoverlapping time slots. The FDM, on the other hand, achieves the multiplexing by dividing an available channel frequency bandwidth into a number of nonoverlapping frequency subbands, each of which is assigned to a single channel. A special type of the FDM, known as multicarrier modulation (MCM), fully utilizes the channel frequency band by allowing the subchannel frequency bands to overlap. Such multiplexing systems can be used not only for communication among multiple users, but also for one-to-one communication. The MCM, in particular, can be applied to a modem where a multiplexing apparatus and a demultiplexing apparatus are formed in a unit ( Bingham, J. A. C., "Multicarrier modulation for data transmission: an idea whose time has come," IEEE Communication Mag., pp. 5–14, May 1990).

Another type of multiplexing system that has received increasing attention in recent years is a code division multiple access (CDMA) system using spread spectrum (SS) communication techniques. In spread spectrum communications, the transmitting bandwidth of the transmitted subchannel signal is much broader than the required bandwidth for information to be sent. The CDMA enables a number of subchannel signals to occupy an overlapping frequency band by encrypting distinct codes in the process of spreading the subchannel signals. At the receiver side, each of the subchannel signals is recovered first by concentrating the spread subchannel signal energy into a narrow frequency band while correlating it with the corresponding code, and then filtering it to pass only the narrow frequency band signal. Since the other subchannel signal energy remains in wideband after the correlation, most of the energy is removed by the filtering process. By this method, the CDMA can spread subchannel signals by assigning a different code sequence to each for implementing a multiplexing communication.

The CDMA has two well-recognized advantages. First, the CDMA offers strong protection against jamming and interference. Jamming signals, regardless of a narrow or wide band, will remain as spreading in broad bands after completion of the despreading operation upon correlation, whereas the desired subchannel signal energy is concentrated in a narrow band, so that a filter can extract the subchannel signals with a high signal-to-noise (S/N) ratio. The CDMA also achieves a higher message privacy in the presence of other listeners. If code sequences in use are maintained in secrecy, unauthorized listeners cannot extract the subchannel signals' components. The CDMA has been applied historically to military communications because of its anti-jamming, anti-interference, and privacy capabilities, but it has recently gained interest for civil applications.

The TDM suffers from interchannel interference if there is a linear distortion in the channel. In contrast, the FDM raises a problem that transmission bandwidth cannot be efficiently used though interchannel interference rarely occurs due to such a linear distortion. In the MCM, subchannel independence is guaranteed by the orthogonal principle whereby the transmission channel bandwidth is efficiently used. However, when there is a linear distortion in the transmission channel, the orthogonal property may not hold, and it generally causes interchannel interference.

The CDMA using a spread spectrum communication technique has excellent anti-jamming property and privacy capability. Applications for commercial telecommunications using the CDMA have been researched these days upon higher demands for communications having such features even for civil use. It is therefore important to devise an alternative CDMA type multiplexing system that is simple and inexpensive.

SUMMARY OF THE INVENTION

It is an object of the invention to provide a multiplexing apparatus and a multiplexing system (which refers to a combination of the multiplexing apparatus and a demultiplexing apparatus) for discrete-time signals that can efficiently use a transmission channel bandwidth without inducing interchannel interference even though a linear distortion exists in the transmission channel.

It is another object of the invention to provide a multiplexing apparatus and a multiplexing system providing virtual subchannels, in which the well-accumulated conventional technology for the linear distortion channel such as channel equalizer or the pulse waveform design methods of digital communication can be utilized easily.

It is a further object of the invention to provide a multiplexing system, having an effect similar to that of the CDMA, built cost-effectively with a relatively simple structure in use of FFT processors or the like.

A multiplexing system according to the invention as applied to a typical communication setting is briefly described using the following relations. Let sequences $\{x_m(n)\}$, $m=0, 1, \ldots , M-1$, of length K be M discrete-time subchannel signals to be transmitted in parallel. Their z-transform representations are defined by $$X_m(z) = \sum_{n=0}^{K-1} x_m(n)z^{-n} \quad (1)$$

For the following discussion, the sequences and their z-transforms are used interchangeably under the relation of (1). The z-transforms are interpreted as polynomials in $z^{-1}$, and simply referred to as polynomials. The Msubchannel signals are first supplied to the multiplexer which produces the multiplexed signal X(z) as its output. This multiplexed signal is then converted to the carrier frequency signal by conventional modulation, and transmitted by the carrier frequency transmission. At the receiver side, the received carrier frequency signal is demodulated to produce the receiver side multiplexed signal Y(z). The receiver side multiplexed signal is then supplied to the demultiplexer which recovers the receiver side subchannel signals as its outputs.

The proposed multiplexing system is based on the Chinese remainder theorem for polynomials, which states: For given relatively prime polynomials $P_m(z)$, m=0, 1, ..., M−1, there exist polynomials $Q_m(z)$, m=0, 1, ..., M−1, that satisfy the congruencies $$Q_k(z) \bmod (P_m(z)) \equiv 1, k = m \quad (2)$$
$$\equiv 0, k \neq m.$$

Let P(z) be defined by $$P(z) = \prod_{m=0}^{M-1} P_m(z). \quad (3)$$

Then, for arbitrary given polynomials $X_m(z)$, m=0, 1, ..., M−1, there exists a polynomial X(z) on mod(P(z)) that satisfies the congruency $X_m(z) \equiv X(z) \bmod (P_m(z))$, m=0, 1, ..., M−1. This polynomial on mod(P(z)) is given by $$X(z) \equiv \sum_{m=0}^{M-1} Q_m(z) X_m(z) \bmod (P(z)). \quad (4)$$

The proposed multiplexing system uses the Chinese remainder theorem for multiplexing subchannel signals; that is, we regard $X_m(z)$, m=0, 1, ..., M−1 as subchannel signals, and X(z) as the multiplexed signal in the interpretation of the theorem. As for demultiplexing, the receiver side subchannel signals are recovered as the residue polynomials given by $$Y_m(z) \equiv Y(z) \bmod (P_m(z)), m=0, 1, \ldots, M-1 \quad (5)$$

from a receiver side multiplexed signal Y(z). Note that, if the relatively prime polynomials $P_m(z)$, m=0, 1, ..., M−1, are given, then $Q_m(z)$, m=0, 1, ..., M−1, and P(z) are uniquely determined. The degrees of the polynomials $P_m(z)$ need to be K so that the original subchannel signals are recovered correctly after demultiplexing. Accordingly, P(z) becomes a polynomial of degree MK by (3), which implies that the multiplexed signal will be of length MK. The multiplexing apparatus in the proposed multiplexing system is a device that actually realizes the function of (4). The multiplexing system in the proposed multiplexing system is a device that consists of both the multiplexing apparatus and demultiplexing apparatus which performs the function of (5).

Performance of the multiplexing system is considered now when the multiplex signal X(z) is transmitted through a channel which is distorted by a linear filter with additive noise. For the baseband channel model for such channel, the receiver side multiplexed signal is given by $$Y(z)=H(z)X(z)+N(z) \quad (6)$$

where H(z) is the transfer function, and N(z) is the additive noise of the baseband channel. Subchannel signals, given as the outputs of demultiplexer, are given by $$Y_m(z) \equiv H_m(z) X_m(z) + N_m(z) \bmod (P_m(z)) \quad (7)$$

where $$H_m(z) \equiv H(z) \bmod (P(z)), N_m(z) \equiv N(z) \bmod (P_m(z)) \quad (8)$$

for m=0, 1, ..., M−1. Each of $X_m(z)$ in these equations coincides with the corresponding transmitted subchannel signal. Note that the other subchannel signals do not appear in each of the equations. That is, the receiver side subchannel signals do not experience interchannel interference from the other subchannel signals as long as the channel is modeled as a linear filter with additive noise.

The form of (7) is basically the same as that of the equation (6) for the linear filter with additive noise channel, and therefore the conventional techniques for such a channel are readily applied to subchannel communications.

The spread spectrum mechanism in the proposed multiplexing system is briefly explained. If τ is the sampling period of a subchannel signal $X_m(z)$, the frequency spectrum is given by $X_m(e^{j2\pi f \tau})$. If the multiplexed signal of length MK is to be transmitted at the same speed as the subchannel signals, the sampling period must be interpreted as τ/M, which means that the spectrum is expanded by M times. In the multiplexer, each subchannel signal $X_m(z)$ is passed through a filter $Q_m(z)$ for m=0, 1, ..., M−1, and then the filter outputs are added. By designing the filters to have broad passband characteristics, energies of the subchannel signals are spread in the expanded frequency range.

The proposed multiplexing system has the following favorable features:

(a) The multiplexing system multiplexes M subchannel signals of length K into a single signal of length MK, and thus does not have any multiplexing loss. In other words, this multiplexing system fully utilizes the available transmission bandwidth of the channel.

(b) The subchannel communication is free from interchannel interference as long as the channel is modeled as a linear filter with additive noise.

(c) For the linearly distorted transmission channel, the virtual subchannel transmission model has basically the same form as the linearly distorted communication model so that the conventional techniques of the linear transmission channel can be easily applied to the subchannel transmissions.

(d) The multiplexer and demultiplexer are implemented economically using commercially available DFT processors by selecting appropriate $P_m(z)$, m=0, 1, ..., M−1, as demonstrated in the embodiments of following section.

(e) The polynomials, $P_m(z)$, m=0, 1, ..., M−1, can be used to maintain secrecy in the communication by hiding their selection, and also to spread the subchannel signal messages in wide frequency bands. In other words, the proposed multiplexing system can provide the favorable properties of CDMA such as anti-jamming and privacy capabilities. Multiplexing systems of this type that are implemented effectively are demonstrated in Embodiments 4, 5 of following section.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF PREFERRED EMBODIMENTS

Figure 1:
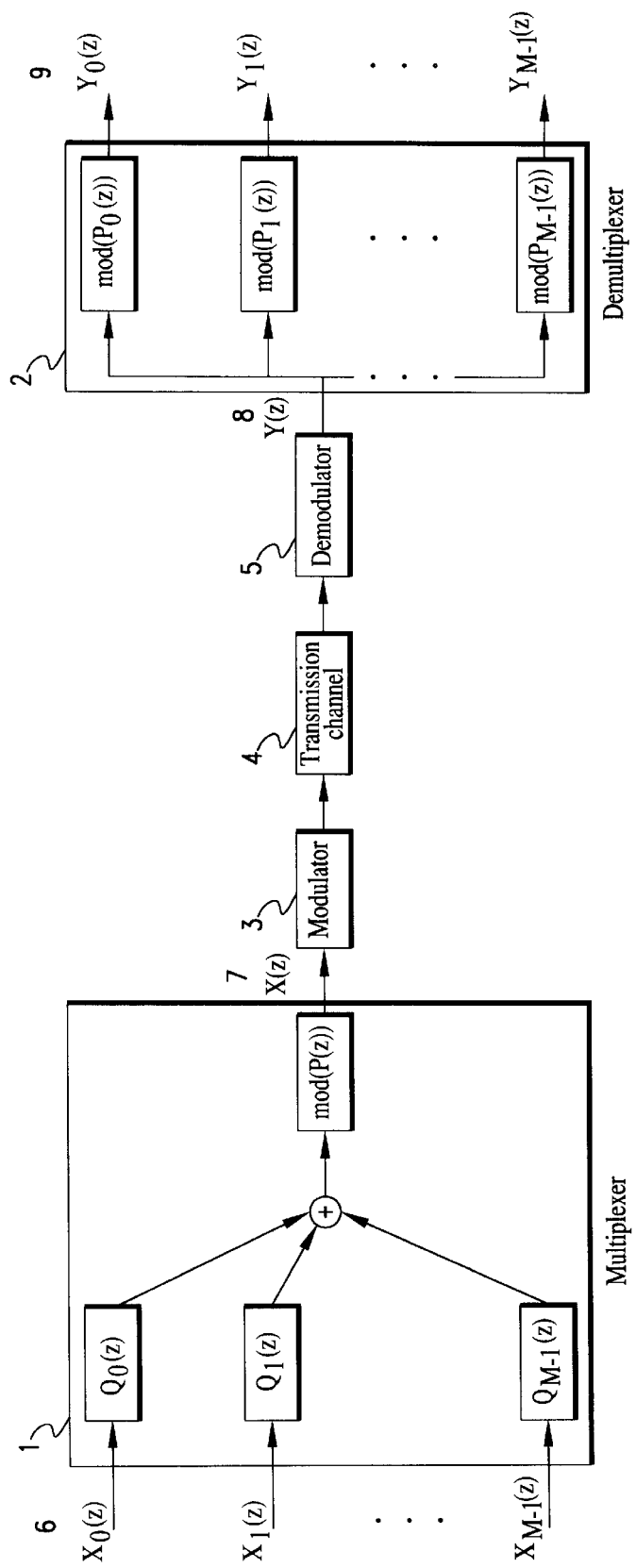
FIG. 1 is a block diagram showing a multiplexing system using a polynomial residual process as applied to a carrier frequency transmission.

FIG. 1 shows the general setting of a proposed multiplexing system as applied to carrier frequency transmission. A relation of a multiplexed signal $X(z)$ and M subchannel signals $X_m(z)$, m=0, 1, ..., M-1, to be multiplexed is characterized by the congruence equation (4).

Each of the subchannel signals $X_m(z)$ is supplied to the corresponding filter $Q_m(z)$, and a multiplexed signal $X_m(z)$ is obtained by taking mod(P(z)) for the sum of the filter outputs. The obtained multiplexed signal is converted to a carrier transmission signal by a modulator 3, and then transmitted over a transmission channel 4. At a receiver side, the received signal is first converted to a receiver side multiplexed signal $Y(z)$ by a demodulator 5. The receiver side subchannel signals are recovered by taking the residue polynomials on mod($P_m(z)$), m=0, 1, ..., M-1, of the receiver side multiplexed signal. As indicated in FIG. 1, the cascade of multiplexing filters and summing operation on mod (P(z)) at the transmission side constitutes the multiplexer 1, and the set of the residue computations at the receiver side constitutes the demultiplexer 2.

Specific embodiments of the multiplexer and demultiplexer vary with a specific choice of polynomials, $P_m(z)$, m=0, 1, ..., M-1.

First Embodiment

In this embodiment, both the subchannel signals and the multiplexed signal take complex values. The complex multiplexed signal can be transmitted via the carrier frequency transmission by quadrature amplitude modulation (QAM). The QAM process modulates the in-phase and quadrature components of the carrier by the real and imaginary parts of the complex multiplexed signal, independently. Assuming that this modulation scheme is used for transmission, the multiplexing system for complex signals is implemented. The multiplexer 1 and the demultiplexer 2 are shown to be implemented efficiently for the appropriate choices of $P_m(z)$, m=0, 1, ..., M-1.

Figure 2:
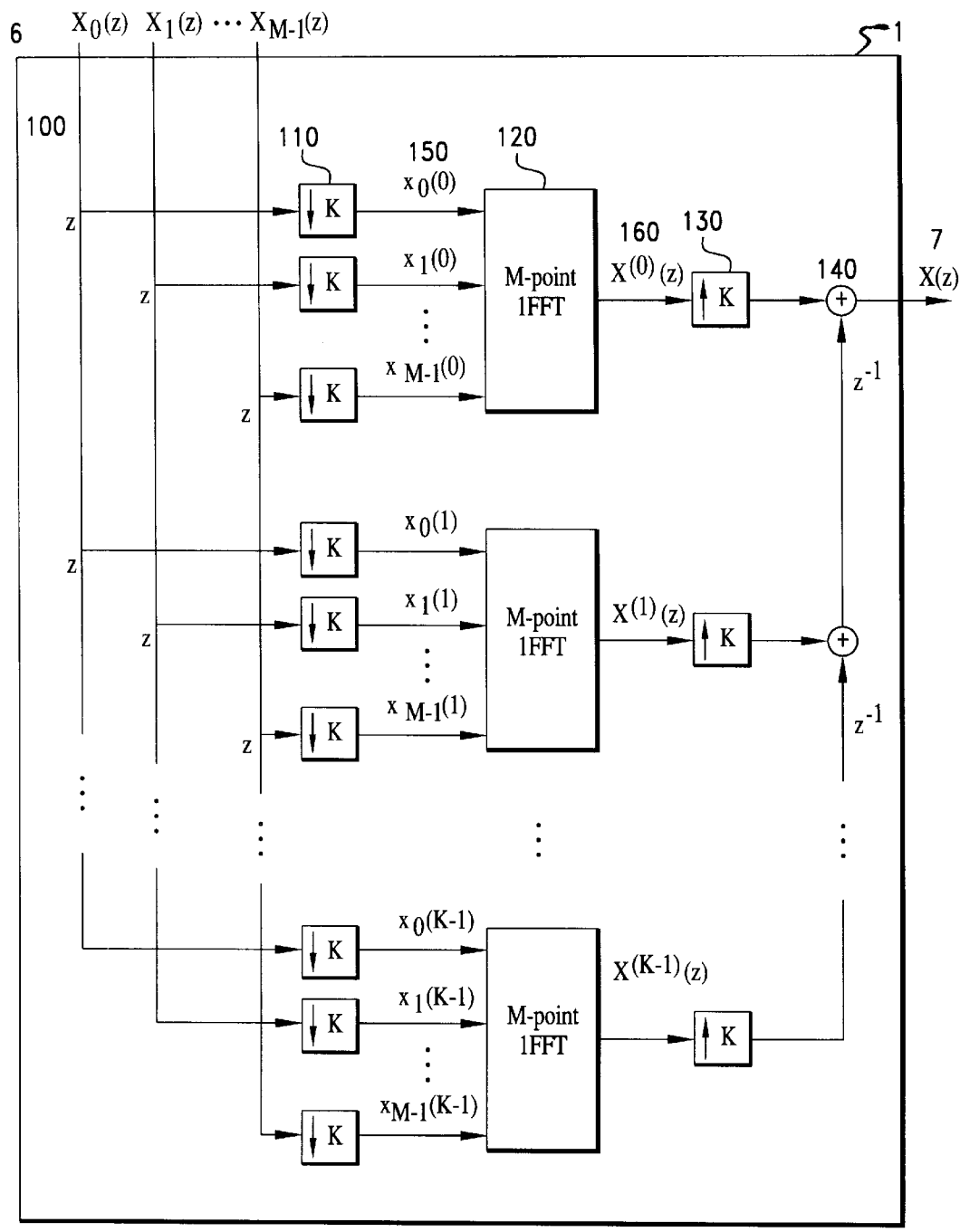
FIG. 2 is a block diagram showing a multiplexer shown as a first embodiment.

FIG. 2 shows a block diagram of the multiplexer 1 suitable for complex signals in which the number of subchannels is M, and the length of the subchannel signals is K. Each of the subchannel signal polynomials is first divided into its coefficients, which are then fed to the inputs of an IFFT (Inverse Fast Fourier Transform) processor 120 as shown in FIG. 2. The boxes with downward arrow and K represent a down-sampler 110, the function of which is to extract one sample from every K samples. In this figure, $x_m(n)$ and $X_m(z)$ are related by Equation (1). The signals $A^{(i)}(z)$ are constructed by assigning the outputs of the IFFT processors to their coefficients in the natural order. The boxes with upward arrows and K represent the up-sampler 130, the function of which is to fill in K-1 zero-valued samples between each pair of samples. This operation has the effect of replacing z with $z^K$ in the polynomial representation. Multiplying by $z^{-i}$ for $X^{(i)}(z^K)$, the MK point multiplexed signal $X(z)$ is constructed as the sum of the multiplied signals which is given as $$X(z) = \sum_{i=0}^{K-1} z^{-i} X^{(i)}(z^K) \tag{9}$$

If x(n), n=0, 1, ..., MK-1, representing the sequence corresponding to $X(z)$, $X^{(i)}(z)$ is the polynomial representation for the sequence x(Kn+i), n=0, 1, ..., M-1. This type of representation is known as polyphase decomposition in the digital signal processing literature. $X^{(i)}(z)$, i=0, 1, ..., K-1, or the corresponding sequences are referred to as polyphase components.

Figure 3:
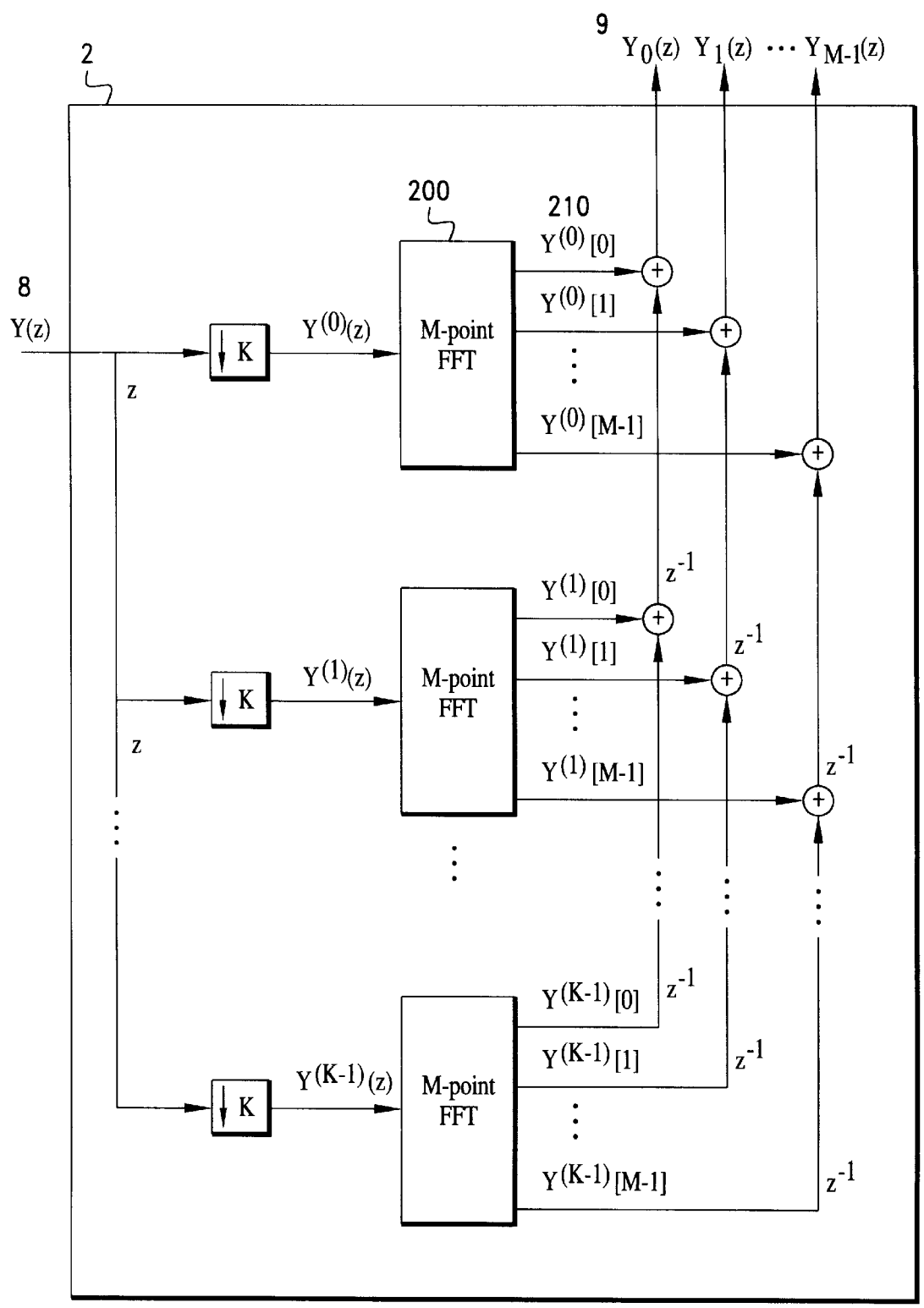
FIG. 3 is a block diagram showing a demultiplexer shown as the first embodiment.

FIG. 3 shows a block diagram for the demultiplexer 2. The polyphase components $Y^{(i)}(z)$, i=0, 1, ..., K-1, of the receiver side multiplexed signal $Y(z)$ are obtained by the cascade process of multiplication by z and down-sampling. Thus, similar to Equation (9), $Y^{(i)}(z)$ and $Y(z)$ are related by $$Y(z) = \sum_{i=0}^{K-1} z^{-i} Y^{(i)}(z^K) \tag{10}$$

The polyphase component $y^{(i)}(n)$ is supplied to an M-point FFT (Fast Fourier transform) processor 200. According to the arrangements shown in the figure, the receiver side subchannel signals $Y_m(z)$ are constructed from the output $y_m(n)$ of the FFT processors. The FFT processor 200 and the IFFT used in the above implementations are DSP processors that efficiently compute the discrete Fourier transform (DFT) and the inverse DFT (IDFT), respectively. The N-point DFT and IDFT are defined by $$X[k] = \sum_{n=0}^{N-1} x(n) e^{-j2\pi nk/N}, k = 0, 1, \ldots, N-1 \tag{11}$$

$$x(n) = \frac{1}{N} \sum_{k=0}^{N-1} X[k] e^{j2\pi nk/N}, n = 0, 1, \ldots, N-1 \tag{12}$$

where $j=\sqrt{-1}$. Square brackets '[ ]' are used to indicate the DFT in order to distinguish it from polynomials.

The DFT is the most important transform in digital signal processing, and various types of LSI processors that efficiently compute these transforms are manufactured as FFT processors (IFFT processors are included as types of FFT processors). As shown in FIG. 2, the multiplexer 1 can be realized by K of the M-point IFFT processors 120. The inputs to the IFFT processor 120 are the coefficients of the subchannel signal themselves, and the multiplexed signal is given as a proper arrangement of the IFFT processor outputs using the up-samplers and the shift operations (multiplications by $z^{-1}$). No arithmetic computations are required for these operations. Therefore, all the arithmetic computations needed in the multiplexer 1 are performed by the IFFT processors 120, and other operations are merely arrangements of the signals. Similarly, all the arithmetic computations for the demultiplexer 12 are also performed by the FFT processors 200.

A theoretical explanation of this embodiment will now be provided. The multiplexing system is based on the polynomial factorizations that were first observed by the present inventior (Hideo Murakami, "Sampling rate conversion systems using a new generalized form of the discrete Fourier transform," IEEE Tr. Signal Processing, vol. 43, no. 9, pp. 2095–2102, Sept. 1995 ). The factorization is given by $$1-z^{-MK} = \prod_{m=0}^{M-1} (1-e^{j2\pi m/M}z^{-K}), \tag{13}$$

where M and K are positive integers. Since the factor polynomials $(1-e^{j2\pi m/M}z^{-K})$, m=0, 1, ..., M-1, on the right hand side of the above equation are relatively prime, the Chinese remainder theorem is applicable. In the above-noted reference, this factorization is applied for fast algorithms of DFT computations and sampling rate conversion systems. However, its application for multiplexing was not discussed.

The demultiplexer 2, based on the factorization of Equation (13), designed according to the congruence equation $$Y_m(z) \equiv Y(z) \bmod (1-e^{j2\pi m/M}z^{-K}), m=0, 1, \ldots, M-1 \tag{14}$$

where Y(z) is the receiver side multiplexed signal. Taking $\bmod(1-e^{j2\pi m/M}z^{-K})$ corresponds to a substitution of $z^K=e^{j2\pi m/M}$ in Y(z). If these substitutions are performed for $Y^{(i)}(z^K)$ in the expression (10), the resulting value becomes the M-point DFT of the sequence corresponding to $Y^{(i)}(z)$. Therefore, the receiver side subchannel signals are given by $$Y_m(z) = \sum_{i=0}^{K-1} z^{-i} Y^{(i)}[m] \tag{15}$$

where $Y^{(i)}[m]$, m=0, 1, ..., M-1, are the DFT of the polyphase component $Y^{(i)}(z)$. Realizing these DFT computations by the FFT processors 200, demultiplexing is configured as shown in the block diagram of FIG. 3. The multiplexer, given as the inverse process of the demultiplexer, is realized as shown in the block diagram in FIG. 2, which is obtained by reversing the process shown in FIG. 3.

When K=1 in this multiplexing system, each of the subchannel signals becomes a single sample point, and multiplexer 1 is constructed using a single IFFT processor 120; that is, the multiplexed signal is given as the inverse DFT of the subchannel sample points. This type of multiplexing system in which the multiplexed signal is given as the inverse DFT of parallel sample points is known as OFDM (orthogonal frequency division multiplexing). Such multiplexing systems are applied in mobile and satellite communications (E. F. Casas and C. Leung, "OFDM for data communication over mobile radio FM channels-part 2: Performance improvement," *IEEE Tr. Communications,* vol. 40, no. 4, pp. 680–683, Apr. 1992; and L. Wei and C. Schlgel, "Synchronization requirements for multi-user OFDM on Satellite mobile and two-path Rayleigh fading channels," *IEEE Tr. Communications,* vol. 43, no. 2/3/4, pp. 887–895, Feb. 1995 ). The multiplexing system of this embodiment includes OFDM as a special case with K=1, and thus has potential applications for mobile and satellite communications. Moreover, the proposed implementation allows subchannel signals to be transmitted as they are without encoding, possibly increasing the range of use, compared to OFDM, for which subchannel signals must be coded prior to multiplexing.

Second Embodiment

In many cases, signals such as speech and images are quantized to take only specified values. For these signals, the subchannel signals can be represented as integer-valued sequences with a finite range. In the following description, the multiplexing system of the first embodiment is modified here for multiplexing such integer-valued subchannel signals.

Number theoretic transform is known as a transform method for integer-valued signals of a finite range. Let q be a positive integer, and R(q) denote the integer residue ring on mod(q). Elements of R(q) are generally represented as integers, 0, 1, ..., q-1, and the addition and multiplication of the elements are performed by integer residue arithmetic on mod(q). If an element α in R(q) satisfies $$\alpha^n \equiv 1 \bmod(q) \tag{16}$$

and if $\alpha^x$ is not unity for any positive integer x of less than N, then α is referred to as a primitive Nth root of unity in R(q). Since all the arithmetics are integer residue arithmetics in this embodiment, the integer congruence will be written simply as the equality '=' to avoid confusion with polynomial congruencies. Using the Nth root of unity, the N-point number theoretic transform and its inverse are defined by $$X(k) = \sum_{n=0}^{N-1} x(n)\alpha^{-nk} \tag{17}$$

$$x(n) = N^{-1} \sum_{k=0}^{N-1} X(k)\alpha^{nk} \tag{18}$$

where $N^{-1}$ is a solution of the congruence Nx=1. If α is replaced by $e^{j2\pi/N}$, equations (17) and (18) become the DFT and IDFT forms. Recognizing that $e^{j2\pi/N}$ is a primitive Nth root of unity on the complex number field, and that α is a primitive root of unity on mod(q), the number theoretic transform is algebraically equivalent to the DFT. When N is a power of two, an FFT-like fast algorithm can be applied to the computation of the number theoretic transform. In particular, when q is a Mersenne number, the number theoretic transform is known as the Mersenne transform, and when q is a Fermat number, the transform is known as the Fermat transform. Computations of such transforms are known to be particularly efficient.

Letting β be a primitive Mth root of unity in R(q), and replacing $e^{j2\pi/M}$ with β in Equation (13), $1-z^{-MK}$ is factored as $$1-z^{-MK} = \prod_{m=0}^{M-1} (1-\beta^m z^{-K}) \tag{19}$$

on R(q). The demultiplexer 2 based on this factorization is given by $$Y_m(z) \equiv Y(z) \bmod(1-\beta^m z^{-K}), m=0, 1, \ldots, M-1. \tag{20}$$

Taking $\bmod(1-\beta^m z^{-K})$ is equivalent to substituting $z^K=\beta^m$ in Y(z). If Y(z) is represented in the polyphase decomposition of the form shown in Equation (10), and if the above-mentioned substitutions are performed, then $Y^{(i)}(\beta^m)$, m=0, 1, ..., M−1, correspond to the M-point number theoretic transform of the polyphase components. Therefore, the multiplexer 1 is implemented simply by replacing the M-point IFFT with the M-point inverse number theoretic transform shown in FIG. 2. Similarly, the demultiplexer 2 is implemented by replacing the M-point FFT with the M-point number theoretic transform shown in FIG. 3.

The number theoretic transform and its inverse transform are computed more efficiently than the FFT and IFFT because the integer residue arithmetic is faster than the complex arithmetic needed in FFT and IFFT. In addition, the system is suitable for digital communication because the resultant multiplexed signals take only specified integer values.

Third Embodiment

For digital communication, signals are generally represented as sequences of binary digits 0 and 1. In this embodiment, the multiplexing system of the first embodiment is modified to be suitable for such binary subchannel signals.

For a prime integer q and a positive integer r, it is possible to build a finite field of $q^r$ elements, which is generally referred to as a Galois field denoted as $GF(q^r)$. $GF(q^r)$ is represented in r-dimensional vector form as $$GF(q^r) = \{(x_1 x_2 \ldots x_r) | x_i \in GF(q)\} \quad (21)$$

The elements of GF(2) are 0 and 1 so that elements of $GF(2^r)$ are represented as r-dimensional vectors with 0 and 1, and such sequences are suitable for coded signals or computer communication.

This multiplexing system is implemented by using $GF(q^r)$ in place of R(q) in the second embodiment. There exists a primitive Mth root of unity in $GF(q^r)$ if M divides $q^r-1$. Using such a primitive root of unity, the M-point transform and its inverse transform are defined by the same forms of Equations (17) and (18) on $GF(q^r)$. Using these transforms, the multiplexing system can be constructed on $GF(q^r)$ using a similar derivation similar to that of the second embodiment. That is, the multiplexer 1 is realized by the M-point transform on $GF(q^r)$ given by Equation (18) in place of IFFT in FIG. 2, and the demultiplexer 2 is realized by the M-point transform on $GF(q^r)$ given by Equation (17) in place of the FFT in FIG. 3.

Since the elements of $GF(q^r)$ are r-dimensional vectors on GF(q), the multiplexed signal can be regarded as a sequence of length rMK with elements in GF(q). For example when q=2, the multiplexed signal will be a binary sequence of length rMK. Such a sequence is suitable for digital communication systems processing binary sequences.

Fourth Embodiment

This embodiment demonstrates the multiplexing systems that have more freedom in the selection of polynomial factorization than that of the previous embodiments. This freedom helps to add the favorable properties of CDMA into the proposed multiplexing systems. First, message privacy is maintained by securing the specific choice of the factorization. Secondly, by selecting appropriate factorization, the subchannel signals can be designed to spread in a wide frequency band so that jamming disturbances do not severely distort any particular subchannel message. As before, it is assumed that the channel number M is a power of two, and the length of the subchannel signals is K.

Figure 4:
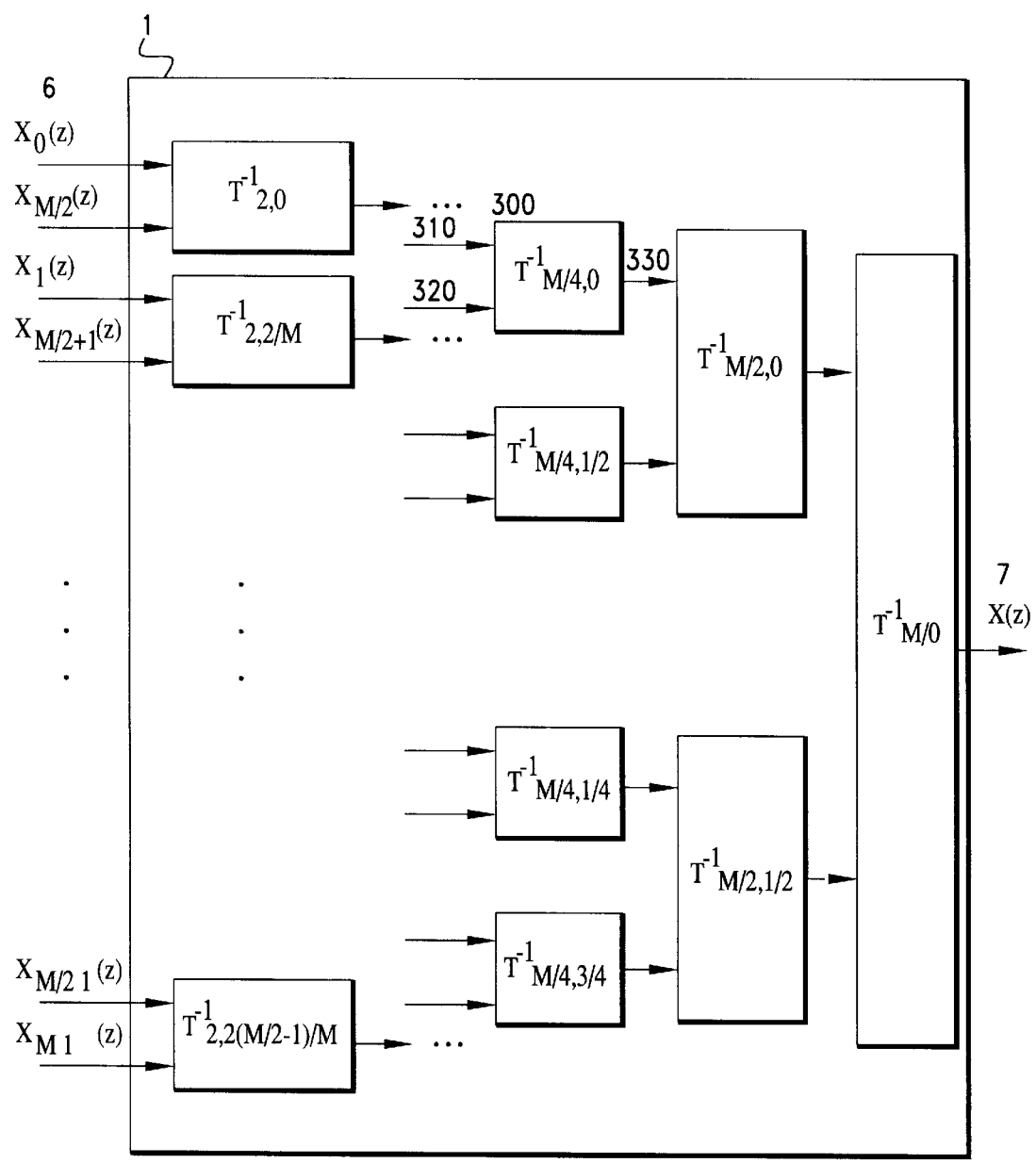
FIG. 4 is a block diagram showing a multiplexer of a multiplexing system using another polynomial residual process as a fourth embodiment.
Figure 5:
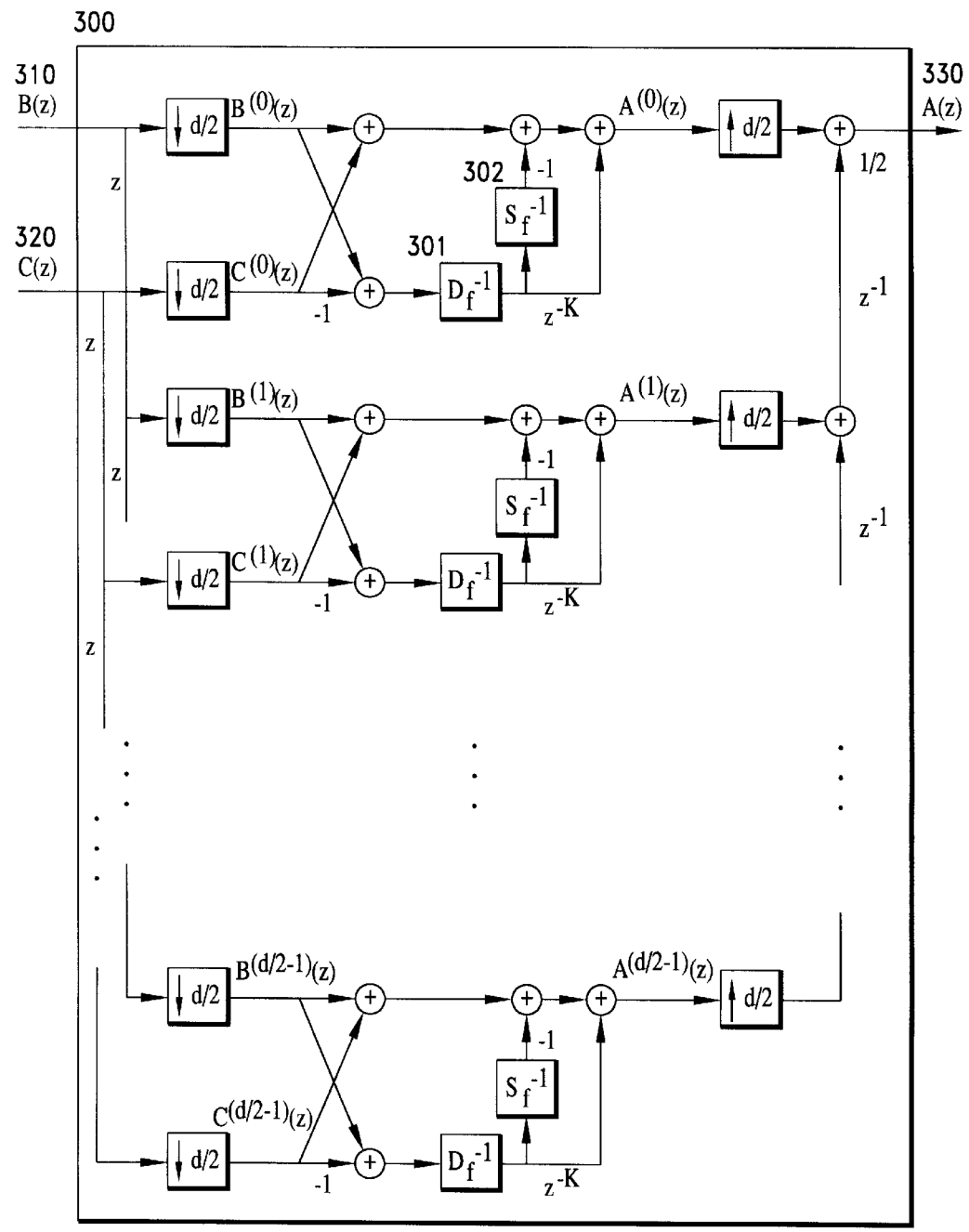
FIG. 5 is a block diagram showing a detailed structure for performing the inverse processing of $T_{df}$-transform in the multiplexer in FIG. 4.
Figure 6:
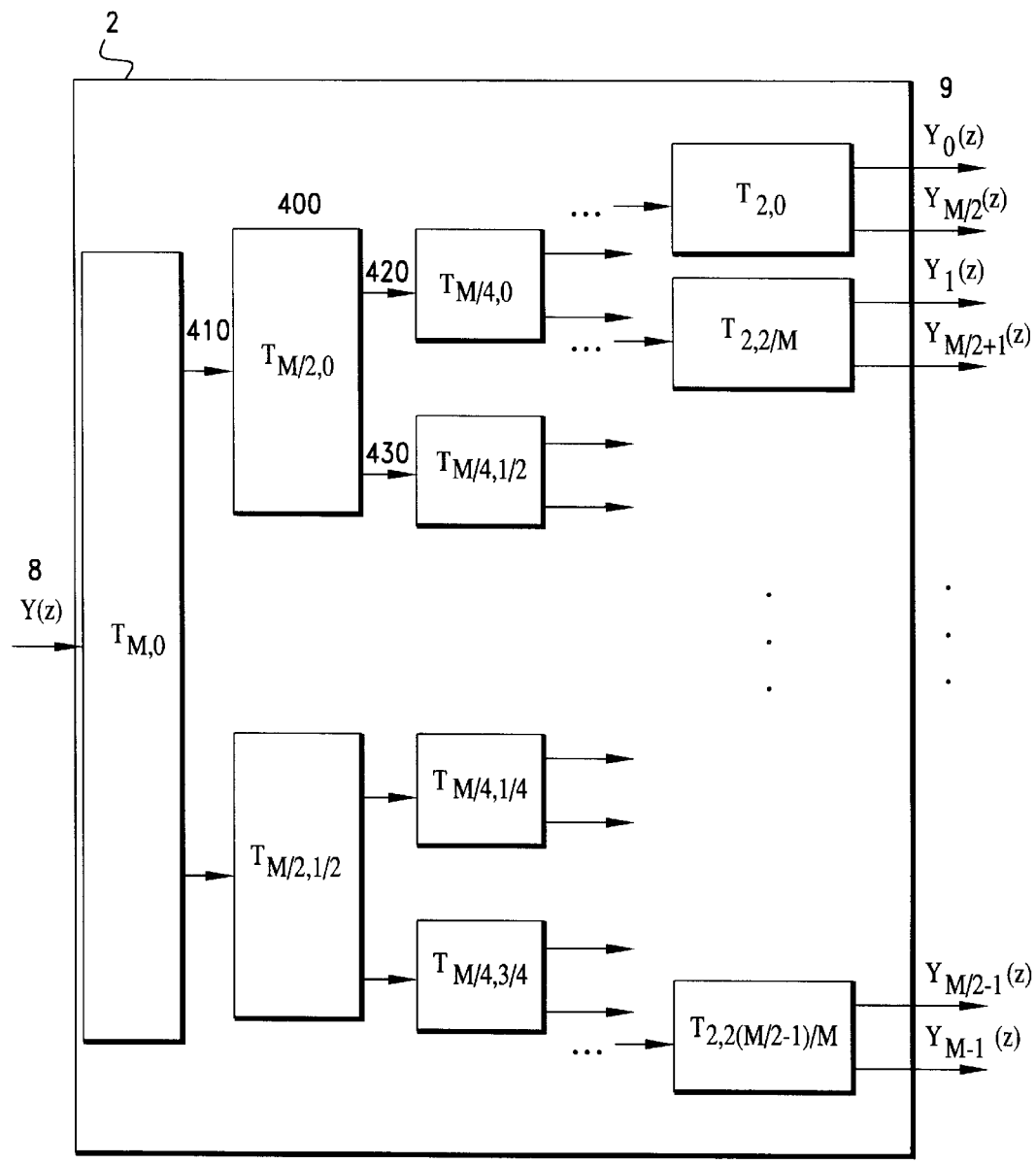
FIG. 6 is a block diagram showing a demultiplexer of the multiplexing system as the fourth embodiment.
Figure 7:
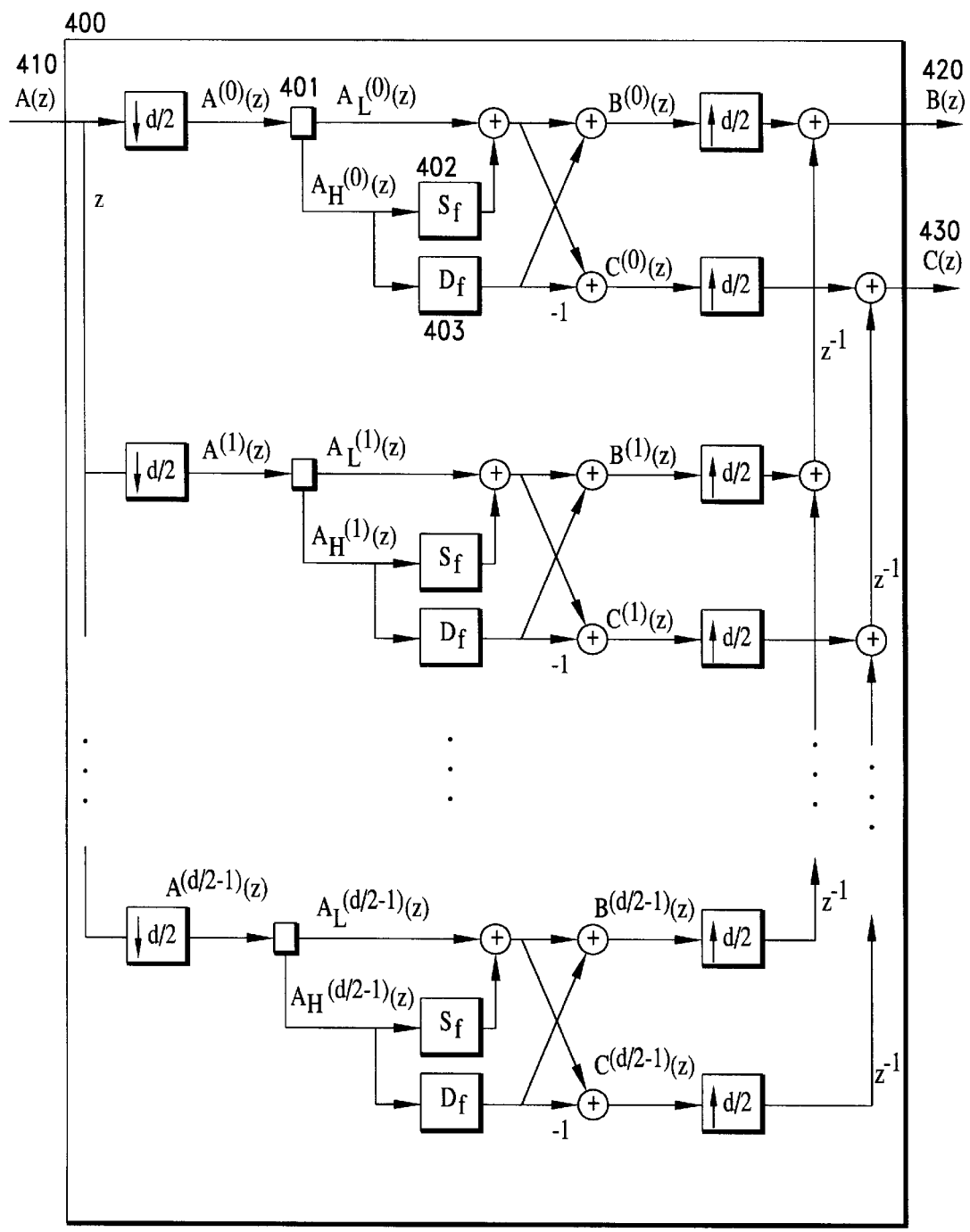
FIG. 7 is a block diagram showing a detailed structure for performing the processing of $T_{df}$-transform in the demultiplexer in FIG. 6.

This embodiment is shown in FIGS. 4, 5, 6, and 7. FIG. 4 shows the overall structure of the multiplexer implementation. $T^{-1}_{df}$ in this figure performs the inverse processing of $T_{df}$-transform defined by Equation (26). Implementation of $T^{-1}_{df}$ is shown in FIG. 5, where $S_f^{-1}$ and $D_f^{-1}$ are the inverse matrices of $S_f$ and $D_f$ that are defined by Equations (32) and (33), respectively. Implementation of the demultiplexer is shown in FIG. 6 and FIG. 7. FIG. 6 shows the overall structure, and FIG. 7 is the illustrates implemention of the $T_{df}$-transform. In FIG. 7, the blank boxes with a single input $A^{(i)}(z)$ and two outputs $A_L^{(i)}(z)$ and $A_H^{(i)}(z)$ divide the input polynomial of degree 2K−1 into two polynomials of degree K−1, according to the relation, $$A^{(i)}(z) = A_L^{(i)}(z) + z^{-K} A_H^{(i)}(z). \quad (22)$$

In the first to third embodiments, if the channel number M and the subchannel signal length K are decided, the polynomial factorization is uniquely determined. However, in this embodiment, there is a freedom in the selection of polynomials. Introducing the polynomial of the form $$\Phi_{d,f} = \prod_{i=0}^{K-1}(1 - e^{j2\pi f} r_i^d z^{-d}) \quad (23)$$

where d is an integer, f is a real number, and $r_i$, i=0, 1, ... , K−1, are nonzero complex numbers, then, using Equation (13), it is possible to prove the factorization, $$\Phi_{M,0} = \prod_{m=0}^{M-1} \Phi_{1,m/M} \quad (24)$$

If roots of each factor polynomial $\Phi_{1,m/n}$ do not have a common root with any of the other factor polynomials, they are relatively prime so that the multiplexing system can be implemented. The selections for $r_i$ are quite arbitrary as long as the selection does not violate the condition of relative primeness. Specific selections really depend on a specific need of the multiplexing system. Their selections might be used as secrete keys for private communication, or for spreading the subchannel signals in wide frequency bands. Moreover, they might be selected to meet both needs.

The present multiplexing system is based on the factorization of Equation (3), in which P(z) is replaced with $\Phi_{M,0}$, and $P_m(z)$ is replaced with $\Phi_{1,m/M}$, m=0, 1, ..., M−1. Since the multiplexer and the demultiplexer are reverse processes of each other, and the process of the demultiplexer is easier to explain, we concentrate upon the demultiplexer. The multiplexer is implemented as the reverse process of the demultiplexer. If Y(z) is the receiver side multiplexed signal, the subchannel signals are recovered by $$Y_m(z) = Y(z) \bmod (\Phi_m(z)) \quad (25)$$

for m=0, 1, ..., M−1. If there is a recursive factorization of $\Phi_{M,0}$ leading to the right hand side factorization of Equation (24), computational efficiency is generally increased by computing the residue polynomials along with the recursive factorization. It is not difficult to see that the $\Phi$-polynomials have a simple factorization property of $\Phi_{d,f} = \Phi_{d/2,f/2} \Phi_{d/2,(f+1)/2}$ when d is even. Since M is assumed to be a power of two, it is possible to obtain the recursive factorization process of $\Phi_{M,0}$ using only this binary factorization form. In order to proceed with the residue computation, the T-transform defined by $$T_{d,f}(A(z)) = (A(z) \bmod (\Phi_{d/2,f/2}), A(z) \bmod (\Phi_{d/2,(f+1)/2})) \quad (26)$$

is introduced. Applying the transforms recursively starting with $T_{M,0}$, the demultiplexer is realized by the tree structured configuration placing the T-transforms at the nodes as shown in FIG. 6.

The transform, $T_{d,f}$, takes a polynomial of degree $dK-1$ and produces two polynomials of degree $dK/2-1$. If the input polynomial $A(z)$ is represented as the polyphase decomposition with $d/2$ components, which is given by replacing Y by A and K by $d/2$ in Equation (10), then the transform is computed by $$T_{d,f}(A(z)) = \sum_{i=0}^{d/2-1} z^{-i}(B^{(i)}(z^{d/2})C^{(i)}(z^{d/2})) \quad (27)$$

where $$(B^{(i)}(z), C^{(i)}(z)) = T_{2,f}(A^{(i)}(z)). \quad (28)$$

$A^{(i)}(z)$ is the polynomial representations for the polyphase component, $a^{(i)}(n)=a(dn/2+i)$, $n=0, 1, \ldots, 2K-1$ when $a(n)$, $n=0, 1, \ldots, dK-1$, is the input sequence corresponding to $A(z)$. These equations mean that $T_{d,f}$ is computed by $d/2$ of the transforms $T_{2,f}$, each of which is applied for the polyphase components.

The transform, $T_{2,f}$, computes two residue polynomials of degree K by taking $\text{mod}(\Phi_{1,f/2})$ and $\text{mod}(\Phi_{1,(f+1)/2})$ for the input polyphase component. If the input $A^{(i)}(Z)$ is divided into two polynomials $A_L^{(i)}(z)$ and $A_H^{(i)}(z)$ by the relation of Equation (22), the first polynomial $A_L^{(i)}(z)$ does not change by taking these mod computations because its degree is less than K. We need to reduce the second half into a polynomial of degree less than K by computing $$A_{H,l(i)}(z) \equiv z^{-K}A_H^{(i)}(z)\text{mod}(\Phi_{l,(f+l)/2}) \quad (29)$$

for $l=0$ and $1$. Then the two outputs, $B^{(i)}(z)$ and $C^{(i)}(z)$, are given by the relation $$T_{2,f}(A^{(i)}(z))=(A_L^{(i)}(z))+A^{(i)}_{H,0}(z), A^{(i)}_L(z)+A^{(i)}_{H,1}(z)) \quad (30)$$

In order to represent the computation of Equation (29) in a matrix form, $\rho_{d,l}(n)$ is defined by the relation, $$z^{-(K+d)} \equiv \sum_{n=0}^{K-1} \rho_{d,l}(n)z^{-n} \text{mod}(\Phi_{1,(f+l)/2}), \text{ for } l=0 \text{ and } 1. \quad (31)$$

The coefficient vector of $A_{H,l}^{(i)}(Z)$ is obtained by multiplying the coefficient vector of $A_H^{(i)}(z)$ by the K×K matrix with entries $\rho_{d,l}(n)$ at (n,d)th place. Then the outputs $B^{(i)}(z)$ and $C^{(i)}(z)$ can be obtained using Equation (30).

There is another approach for computing the outputs: Introduce a K×K matrix $S_f$ with entries $(\rho_{d,0}(n)+\rho_{d,1}(n))/2$ at (n,d)th place, and a matrix $D_f$, with entries $(\rho_{d,0}(n)-\rho_{d,1}(n))/2$ at (n,d)th place. If the matrix $S_f$ is multiplied by the coefficient vector of $A_H^{(i)}(z)$, the result gives the coefficient vector of $(A_{H,0}^{(i)}(z)+A_{H,1}^{(i)}(z))/2$. Similarly, if $D_f$ is multiplied by the coefficient vector of $A_H^{(i)}(z)$, the result gives the coefficient vector of $(A_{H,0}^{(i)}(z)-A_{H,1}^{(i)}(z))/2$. On the other hand, the two outputs, $B^{(i)}(z)$ and $C^{(i)}(z)$, are related to the two resultant coefficient vectors by $(B^{(i)}(z)+C^{(i)}(z))/2=A_L^{(i)}(z)+(A_{H,0}^{(i)}(z)+A_{H,1}^{(i)}(z))/2$ and $(B^{(i)}(z)-C^{(i)}(z))2=(A_{H,0}^{(i)}(z)-A_{H,1}^{(i)}(z))/2$ from Equation (30). If $(B^{(i)}(z)+C^{(i)}(z))/2$ and $(B^{(i)})(z)-C^{(i)}(z))/2$ are computed by the above formulae, $B^{(i)}(z)$ and $C^{(i)}(z)$ are easily obtained by adding and subtracting the computed polynomials. FIG. 7 shows the implementation of $T_{d,f}$ based on Equation (27), and using the second approach for each $T_{2,f}$.

The reason for using the second approach is that many entries of $S_f$ and $D_f$ are zero as explained in the following. By the definition of $\Phi_{d,f}$, if z is replaced by $-z$ in $\Phi_{1,(f+1)/2}$, then it becomes equal to $(\Phi_{1,f/2})$. Doing this replacement, we can show that $\rho_{d,1}(n)=(-1)^{K+d+n}\rho_{d,0}(n)$, which in turn implies $\rho_{d,0}(n)+\rho_{d,1}(n)=(1+(-1)^{K+d+n})\rho_{d,0}(n)$ and $\rho_{d,0}(n)-\rho_{d,1}(n)=(1-(-1)^{K+d+n})\rho_{d,0}(n)$. Therefore the two matrices are given by $$S_f = \frac{1}{2}\begin{bmatrix} (1+(-1)^K)\rho_{0,0}(0) & (1+(-1)^{K+1})\rho_{1,0}(0) & \cdots & 0 \\ (1+(-1)^{K+1})\rho_{0,0}(1) & (1+(-1)^K)\rho_{1,0}(1) & \cdots & 2\rho_{K-1,0}(1) \\ \vdots & \vdots & & \\ 0 & 2\rho_{1,0}(K-1) & \cdots & (1+(-1)^K)\rho_{K-1,0}(K-1) \end{bmatrix} \quad (32)$$

$$D_f = \frac{1}{2}\begin{bmatrix} (1-(-1)^K)\rho_{0,0}(0) & (1-(-1)^{K+1})\rho_{1,0}(0) & \cdots & 2\rho_{K-1,0}(0) \\ (1-(-1)^{K+1})\rho_{0,0}(1) & (1-(-1)^K)\rho_{1,0}(1) & \cdots & 0 \\ \vdots & \vdots & & \\ 2\rho_{0,0}(K-1) & 0 & \cdots & (1-(-1)^K)\rho_{K-1,0}(K-1) \end{bmatrix} \quad (33)$$

Clearly, half of the entries of $S_f$ and $D_f$ are zero. Thus multiplications by $S_f$ and $D_f$ are computed by half of the required arithmetic for a single K×K matrix multiplication. Whereas if the first approach is used, it requires two K×K matrix multiplications to obtain the same outputs.

The multiplexing is implemented by reversing the process of the demultiplexer. FIG. 4 shows the overall structure of multiplexing obtained by reversing the process of FIG. 6. FIG. 5 shows the implementation of $T^{-1}_{d,f}$ obtained by reversing each process for $T_{d,f}$ in FIG. 7.

Fifth Embodiment

This embodiment is an alternative realization of the fourth embodiment. Therefore this embodiment also demonstrates the multiplexing systems that have more freedom in the selection of polynomial factorization. This freedom helps to add the favorable properties of CDMA into the proposed multiplexing systems. Namely, message privacy is maintained by securing the specific choice of the factorization, and the subchannel signals can be designed to spread in a wide frequency band so that jamming disturbances do not severely distort any particular subchannel message. As before, it is assumed that the channel number M is a power of two, and the length of the subchannel signals is K.

Figure 8:
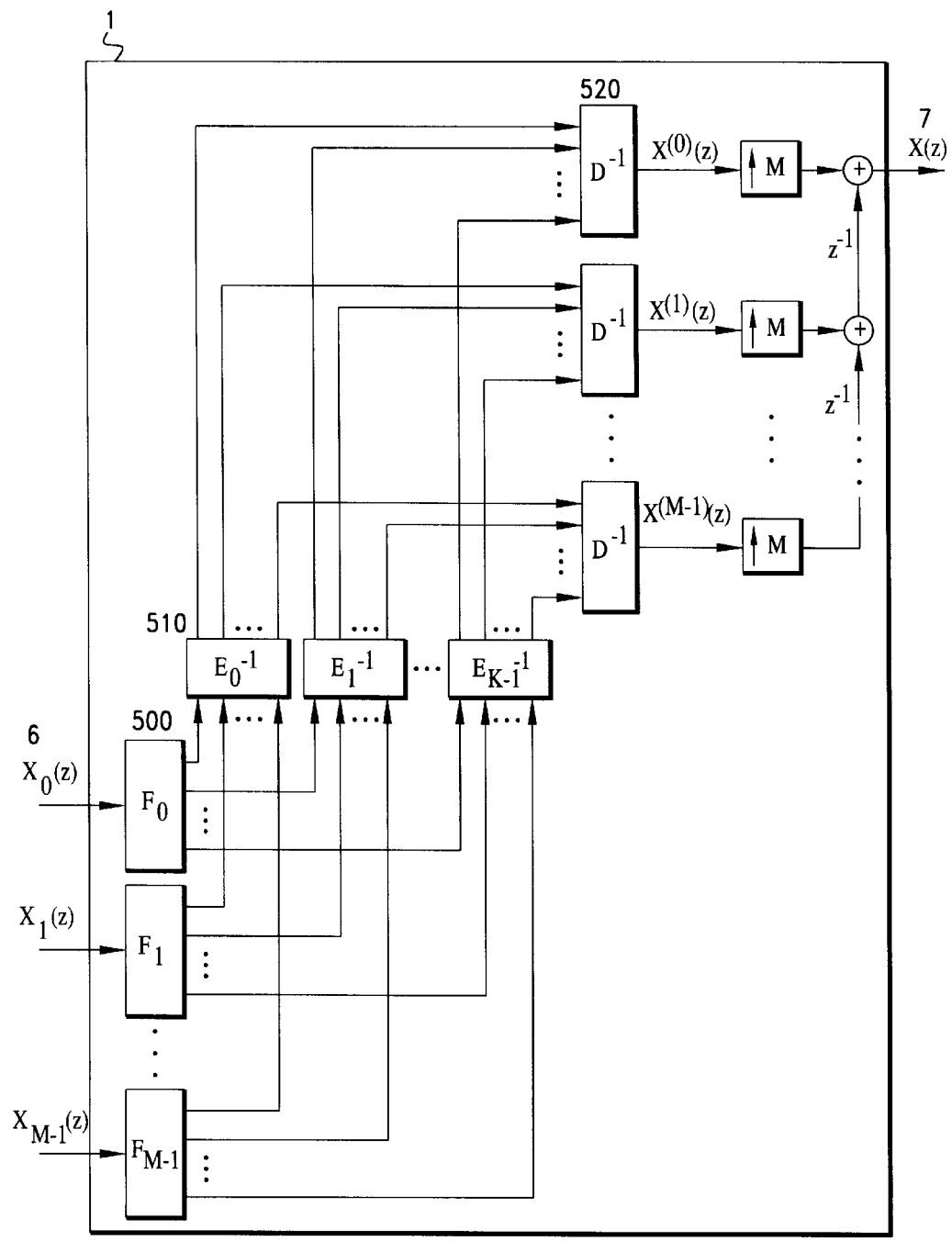
FIG. 8 is a block diagram showing a multiplexer of a multiplexing system as a fifth embodiment, based on an alternative computation process to the fourth embodiment.
Figure 9A:
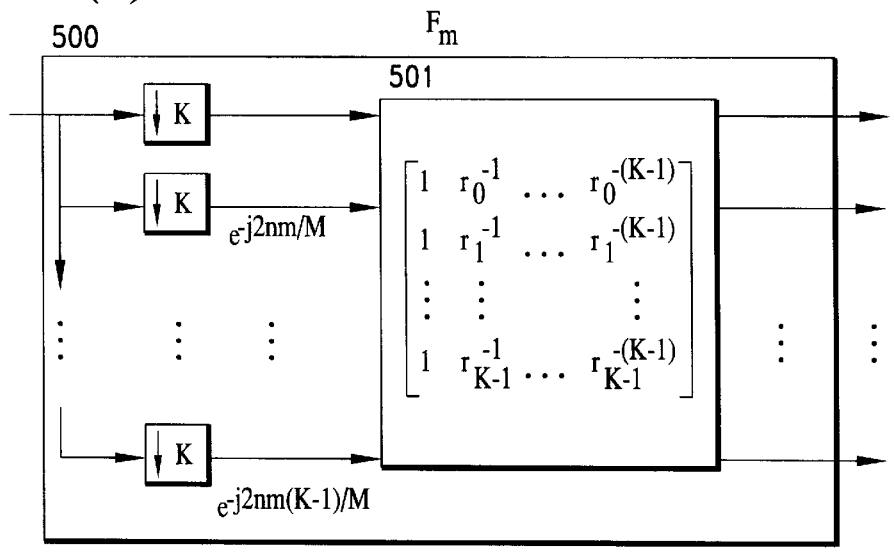
FIGS. 9(a), 9(b), 9(c) are block diagrams showing matrix multipliers, respectively, in the multiplexer in FIG. 8.
Figure 9B:
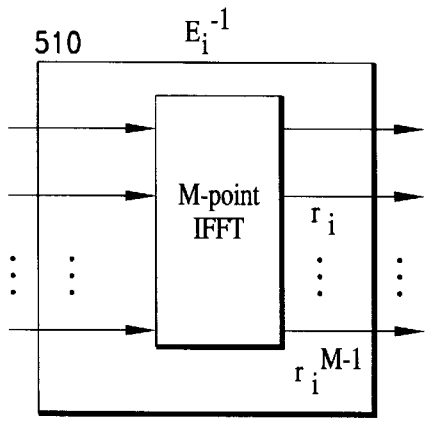
Figure 9C:
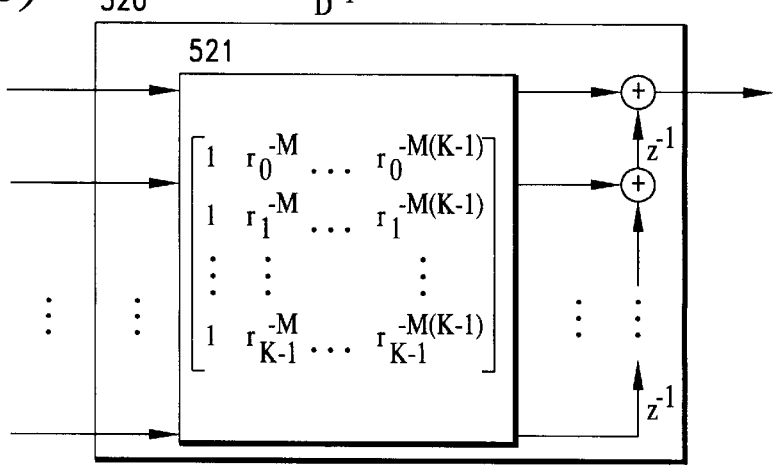
Figure 10:
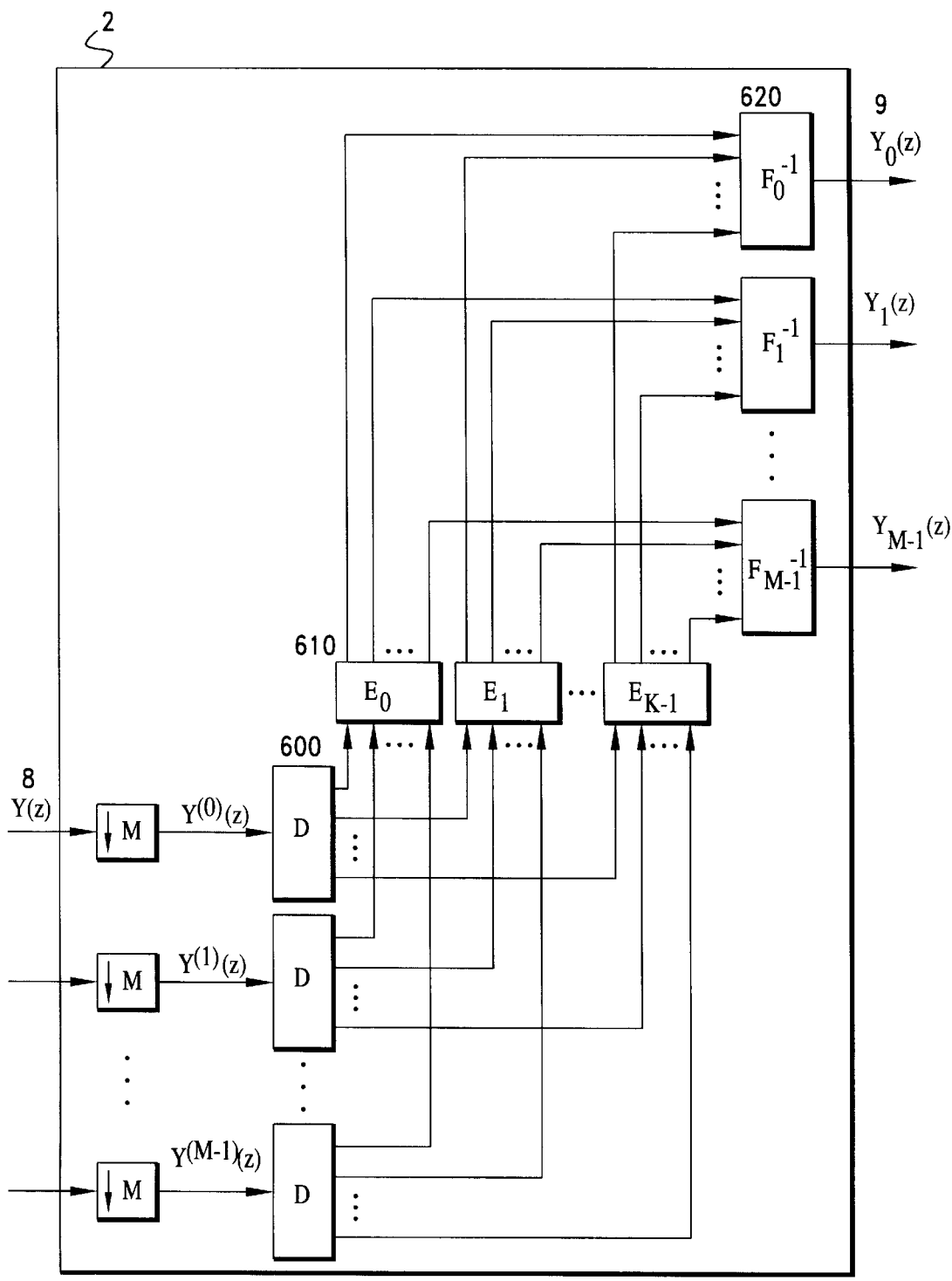
FIG. 10 is a block diagram showing a demultiplexer of the multiplexing system as the fifth embodiment.

FIGS. 8–11 illustrate the structure of this embodiment. FIG. 8 is the overall structure of the multiplexer implementation. The boxes with $F_m$, $E_i^{-1}$ and $D^{-1}$ in this figure are matrix multipliers, and their details are given in FIGS. 9(a), (b) and (c). $r_i$, i=0, 1, ..., K−1, are complex numbers to be decided for a specific need of the multiplexing system. As shown in FIG. 9(b), the matrix multiplication by $E_1^{-1}$ is implemented efficiently by an IFFT processor. Implementation of the demultiplexer is shown by FIG. 10 and FIG. 11. FIG. 10 is the overall structure, and FIG. 11 shows detailed operations of the boxes in FIG. 10.

The multiplexing system of this embodiment is based on the factorization of Equation (24). The computational process of demultiplexing for this type includes the following three steps:

Step 1: $\Phi_{M,0}$ is factored as the product of $1-r_i^M z^{-M}$, $i=0, 1, \ldots, K-1$, by the definition of $\Phi_{df}$ in (23). This step computes the residue polynomials on the factor polynomials. Representing $Y(z)$ in the polyphase decomposition by $M$ components, and substituting $z^M = r_i^M$ in the decomposition, the residue polynomials are given by $$U_i(z) = \sum_{m=0}^{M-1} z^{-m} Y^{(m)}(r_i^M), \quad i = 0, 1, \ldots, K-1. \tag{34}$$

In these equations, $Y^{(m)}(r_i^M)$, $i=0, 1, \ldots, K-1$, are computed by the matrix multiplication from the coefficient vector of $Y^{(m)}(z)$ by $$\begin{bmatrix} Y^{(m)}(r_0^M) \\ Y^{(m)}(r_1^M) \\ \vdots \\ Y^{(m)}(r_{K-1}^M) \end{bmatrix} = \begin{bmatrix} 1 & r_0^{-M} & \cdots & r_0^{-M(K-1)} \\ 1 & r_1^{-M} & \cdots & r_1^{-M(K-1)} \\ \vdots & \vdots & & \vdots \\ 1 & r_{K-1}^{-M} & \cdots & r_{K-1}^{-M(K-1)} \end{bmatrix} \begin{bmatrix} y^{(m)}(0) \\ y^{(m)}(1) \\ \vdots \\ y^{(m)}(K-1) \end{bmatrix} \tag{35}$$

Figure 11A:
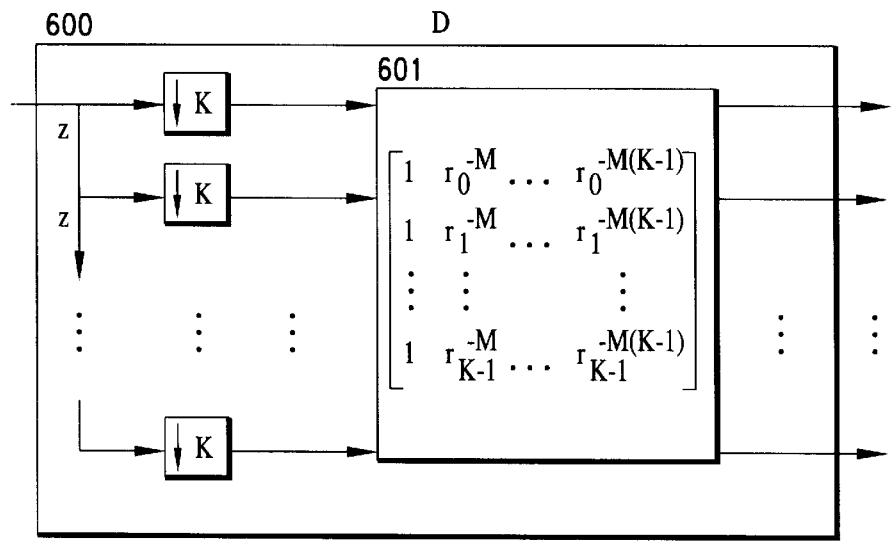
FIGS. 11(a), 11(b), 11(c) are block diagrams showing matrix multipliers, respectively, in the demultiplexer in FIG. 10.

Denoting the matrix in Equation (35) by D, the matrix multiplications are indicated by the boxes marked D in FIG. 10, and the detail is given in FIG. 11(a). Polynomials $U_i(z)$ are constructed by arranging the outputs of the matrix multiplications in accordance with Equation (34).

Figure 11B:
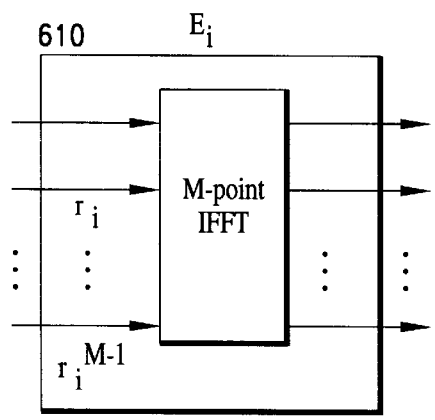

Step 2: The polynomials $1-r_i^M z^{-M}$ is further factored as the product of $1-r_i e^{j2\pi m/M} z^{-1}$, $m=0, 1, \ldots, M-1$. This step computes the residue polynomials along with these factorizations. Since the factor polynomials are polynomials of degree one, the residues become scalars given by $$U_i[m] \equiv U_i(z) \bmod (1-r_i e^{j2\pi m/M} z^{-1}), \tag{36}$$

for $m=0, 1, \ldots, M-1$, and $i=0, 1, \ldots, K-1$. These operations are indicated by the boxes with $E_i$ in FIG. 10. Computation of Equation (36) is performed first by multiplying $r_i^{-n}$ for the coefficient of $z^{-n}$ in $U_i(z)$, and then taking an M-point DFT of the resultant sequence. Therefore, as shown in FIG. 11(b), this process can be implemented efficiently by FFT processors assuming M is a power of two.

Step 3: The receiver side subchannel signals $Y_m(z)$ is the residue polynomial on $\bmod((\Phi_{1,m/M})$, in which $\Phi_{1,m/M}$ is the product of $1-e^{j2\pi m/M} r_i z^{-1}$, $i=0, 1, \ldots, K-1$ by the definition. Therefore, $Y_m(z)$ and $U_i[m] \equiv i=0, 1, \ldots, K-1$, are related by $$U_i[m] \equiv Y_m(z) \bmod (1-e^{j2\pi m/M} r_i z^{-1}) i=0, 1, \ldots, K-1. \tag{37}$$

These equations can be written in a matrix form as $$\begin{bmatrix} U_0[m] \\ U_1[m] \\ \vdots \\ U_{K-1}[m] \end{bmatrix} = \begin{bmatrix} 1 & r_0^{-1} & \cdots & r_0^{-(K-1)} \\ 1 & r_1^{-1} & \cdots & r_1^{-(K-1)} \\ \vdots & \vdots & & \vdots \\ 1 & r_{K-1}^{-1} & \cdots & r_{K-1}^{-(K-1)} \end{bmatrix} \begin{bmatrix} y_m(0) \\ y_m(1)e^{-j2\pi m/M} \\ \vdots \\ y_m(K-1)e^{-j2\pi m(K-1)/M} \end{bmatrix} \tag{38}$$

Figure 11C:
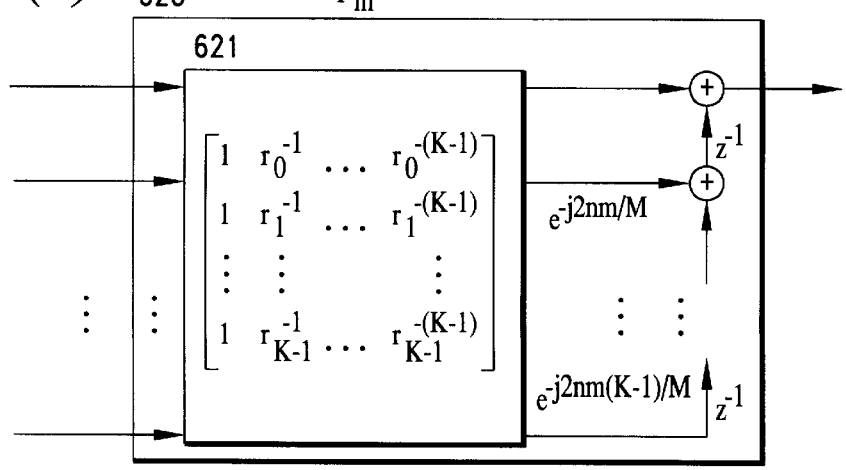

By this relation, we can see that $Y_m(z)$ is obtained from $U_i[m]$, $i=0, 1, \ldots, K-1$, by the system shown in FIG. 11(c). These operations are represented by the boxes marked $F_m^{-1}$ in FIG. 10.

Reversing the process of the demultiplexer in FIG. 10, the multiplexer is implemented by the system shown in FIG. 8. FIGS. 9(a), (b), and (c) show the detailed operations of the boxes in FIG. 8.

The foregoing description of preferred embodiments of the invention have been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A transmitter, comprising:
   a terminal for receiving M subchannel signals $X_m(z)$ (m=0 to M−1) of length greater than one,
   a multiplexing apparatus that is responsive to the received M subchannel signals $X_m(z)$ (m=0 to M−1) of length greater than one, to produces a multiplexed signal $X(z)$, the multiplexing apparatus comprising means of obtaining a polynomial $X(z)$ that satisfies $X(z) \equiv X_m(z) \bmod(P_m(z))$ (m=0 to M−1), wherein $P_m(z)$ (m=0 to M−1) are relatively prime polynomials; and
   means for transmitting the multiplexed signal $X(z)$.

2. The transmitter of claim 1, wherein the multiplexing apparatus includes a Fast Fourier Transform processor.

3. The transmitter of claim 1, wherein the multiplexing apparatus includes a digital signal processor.

4. The transmitter of claim 1, wherein the multiplexing apparatus includes an LSI processor.

5. The transmitter of claim 1, wherein the polynomials $P_m(z)$ (m=0 to M−1) have the form $(1 e^{j2\pi m/M} z^{-K})$ (m=0 to M−1), wherein K is greater than one.

6. The transmitter of claim 1, wherein the polynomials $P_m(z)$ (m=0 to M−1) have the form $(1-e^{j2\pi m/M} r_0 z^{-1})(1-e^{j2\pi m/M} r_1 z^{-1}) \ldots (1-e^{j2\pi m/M} r_{K-1} z^{-1}))$(m=0 to M−1), where $r_i$ is a non-zero complex number (i=0 to K−1); K greater than one.

7. The multiplexing apparatus of claim 1, in which arithmetic is performed on a finite field and $(1-\alpha^m \beta_0 z^{-1})(1-\alpha^m \beta_1 z^{-1}) \ldots (1-\alpha^m \beta_{K-1} z^{-1})$ is used as $P_m(z)$ (m=0 to M−1), wherein $\beta_i$ is a non-zero element (i=0 to K−1), and $\alpha$ is a primitive Mth root of unity in the finite field.

8. A receiver, comprising
   means for receiving a receiver side multiplexed signal $Y(z)$, and
   a demultiplexing apparatus that takes the receiver side multiplexed signal $Y(z)$, and produces receiver side subchannel signals $Y_m(z)$ (m=0 to M−1), the demultiplexing apparatus comprising means of computing $Y_m(z) \equiv Y(z) \bmod(P_m(z))$ (m=0 to M−1), wherein $P_m(z)$ (m=0 to M−1) are relatively prime polynomials.

9. The receiver of claim 8, wherein said demultiplexing apparatus includes an Inverse Fast Fourier Transform processor.

10. The receiver of claim 8, wherein said demultiplexing apparatus includes a digital signal processor.

11. The receiver of claim 8, wherein said demultiplexing apparatus includes an LSI processor.

12. The receiver of claim 8, wherein the polynomials $P_m(z)$ (m=0 to M−1) have the form $(1-e^{j2\pi m/M} z^{-K})$ (m=0 to M−1), wherein K is greater than one.

13. The receiver of claim 8, wherein the polynomials $P_m(z)$ (m=0 to M−1) have the form $(1-e^{j2\pi m/M} r_0 z^{-1})(1-$ $e^{j2\pi m/M}r_1z^{-1}) \ldots (1-e^{j2\pi m/M}r_{K-1}z^{-1}))$ (m=0 to M−1), where $r_i$ is a non-zero complex number (i=0 to K−1); K greater than one.

14. The demultiplexing apparatus of claim 8, in which arithmetic is performed on a finite field, and $(1-\alpha^m\beta_0z^{-1})$ $(1-\alpha^m\beta_1z^{-1}) \ldots (1-\alpha^m\beta_{K-1}z^{-1})$ is used as $P_m(z)$ (m=0 to M−1), wherein $\beta_i$ is a non-zero element (i=0 to K−1), and $\alpha$ is a primitive Mth root of unity in the finite field.

15. A multiplexing system for transmitting subchannel signals over a communication channel, the system comprising:
   a transmitter, including
      a terminal for receiving M subchannel signals $X_m(z)$ (m=0 to M−1) of length greater than one,
      a multiplexing apparatus, the multiplexing apparatus taking the received M subchannel signals $X_m(z)$ (m=0 to M−1) of length greater than one, and producing a multiplexed signal X(z) to be transmitted, the multiplexing apparatus comprising means of obtaining a polynomial X(z) that satisfies X(z)≡$X_m$(z)mod($P_m(z)$) (m=0 to M−1), wherein $P_m(z)$ (m=0 to M−1) are relatively prime polynomials, and
      means for transmitting the multiplexed signal X(z) over the communication channel; and
   a receiver, including
      means for receiving a receiver side multiplexed signal Y(z) from the communication channel, including the signal X(z) transmitted from the transmitter, and
      a demultiplexing apparatus that takes the received multiplexed signal Y(z), and produces receiver side subchannel signals $Y_m(z)$ (m=0 to M−1), the demultiplexing apparatus comprising means of computing $Y_m(z)$≡Y(z)mod($P_m(z)$) (m=0 to M−1), wherein $P_m(z)$ (m=0 to M−1) are relatively prime polynomials.

16. The multiplexing system of claim 15, wherein the transmitter includes a modulator and the receiver includes a demodulator, further comprising a linear channel though which the multiplexed signal X(z) transmitted from the modulator to the demodulator.

17. The multiplexing system of claim 15, wherein said multiplexing apparatus and said demultiplexing apparatus each include a digital signal processor, respectively implemented as a Fast Fourier Transform processor and an Inverse Fast Fourier Transform processor.

18. The multiplexing system of claim 15, wherein said multiplexing apparatus and said demultiplexing apparatus each includes an LSI processor, respectively implemented as a Fast Fourier Transform processor to perform a discrete Fourier Transform and an Inverse Fast Fourier Transform processor to perform an inverse discrete Fourier Transform.

19. A multiplexing system for transmitting subchannel signals over a communication channel, the system comprising:
   a transmitter, including
      a terminal for receiving M subchannel signals $X_m(z)$ (m=0 to M−1) of length greater than one,
      a multiplexing apparatus, the multiplexing apparatus taking the received M subchannel signals $X_m(z)$ (m=0 to M−1) of length greater than one, and producing a multiplexed signal X(z) to be transmitted, the multiplexing apparatus comprising means of obtaining a polynomial X(z) that satisfies X(z)≡$X_m$(z)mod($1-e^{j2\pi m/M}z^{-K}$) (m=0 to M−1), where K is greater than one, and
      means for transmitting the multiplexed signal X(z); and
   a receiver, including
      means for receiving that a receiver side multiplexed signal Y(z), including the multiplexed signal X(z) transmitted from the transmitter, and
      a demultiplexing apparatus that takes the received multiplexed signal Y(z), and produces receiver side subchannel signals $Y_m(z)$ (m=0 to M−1), the demultiplexing apparatus comprising means of computing $Y_m(z)$≡Y(z)mod($1-e^{j2\pi m/M}z^{-K}$) (m=0 to M−1) where K is greater than one.

20. A demultiplexing apparatus that takes a receiver side multiplexed signal Y(z), and produces receiver side subchannel signals $Y_m(z)$ (m=0 to M−1), the demultiplexing apparatus comprising:
   means of performing K-fold polyphase decomposition of the receiver side multiplexed signal, and producing K polyphase sequences of length M, K an integer greater than 1;
   means of computing M-point DFT for all the polyphase sequences;
   means of arranging the DFT output samples in M groups of K samples such that each group contains samples at the same position in the DFT outputs, taking one from each DFT output; and
   means of producing M polynomials of degree K−1 by assigning samples in each group to coefficients of each polynomial in the order of the polyphase decomposition.

21. The demultiplexing apparatus of in claim 20, in which arithmetic is performed on an integer residue ring, and the DFT is replaced by the number theoretic transform.

22. A demultiplexing apparatus according to claim 20, in which arithmetic is performed on a finite field, and the DFT is replaced by the DFT-like transform on the finite field.

23. A multiplexing system for transmitting subchannel signals over a communication channel, the system comprising:
   a transmitter, including
      means for receiving M subchannel signals $X_m(z)$ (m=0 to M−1) including K ordered positions, where K is greater than one,
      a multiplexer including
         means of extracting a sample from each of the K positions of each of the M subchannel signals,
         means of arranging the MK samples in K groups of M samples such that each group contains samples corresponding to the same position in the order of K positions in the subchannel signals,
         means of arranging the samples of each group in the order of subchannels, and computing M-point inverse DFT of the arranged samples for all of the groups, and
         means of producing an MK-length signal by performing K-fold polyphase composition of the inverse DFT outputs, and
      means for transmitting the MK-length signal; and
   a receiver, including
      means for receiving a receiver side multiplexed signal Y(z) including the MK-length signal transmitted from the transmitter, and
      a demultiplexer that produces receiver side subchannel signals $Y_m(z)$ (m=0 to M−1), from the receiver side multiplexed signal Y(z), including
         means of performing K-fold polyphase decomposition of the receiver side multiplexed signal, and producing K polyphase sequences of length M,
         means of computing M-point DFT for all the polyphase sequences;

means of arranging the DFT output samples in M groups of K samples such that each group contains samples at the same position in the DFT outputs, taking one from each DFT output; and means of producing M polynomials of degree K−1 by assigning samples in each group to coefficients of each polynomial in the order of the polyphase decomposition.

24. A multiplexing system for transmitting subchannel signals over a communication channel, the system comprising:

a transmitter, including
means for receiving M subchannel signals $X_m(z)$ (m=0 to M−1) including K ordered positions, where K is greater than one,
a multiplexer including
means of extracting a sample from each of the K positions of each of the M subchannel signals,
means of arranging the MK samples in K groups of M samples such that each group contains samples corresponding to the same position in the order of K positions in the subchannel signals,
means of arranging the samples of each group in the order of subchannels, and computing M-point inverse number theoretic transform of the arranged samples for all of the groups, and
means of producing MK-length signal by performing K-fold polyphase composition of the inverse number theoretic transform outputs,
wherein arithmetic is performed on an integer residue ring, and
means for transmitting the MK-length signal; and a receiver, including
means for receiving a receiver side multiplexed signal Y(z), including the MK-length transmitted by the transmitter, and
a demultiplexer that produces receiver side subchannel signals $Y_m(z)$ (m=0 to M−1), from the receiver side multiplexed signal Y(z), including
means of performing K-fold polyphase decomposition of the receiver side multiplexed signal, and producing K polyphase sequences of length M,
means of computing M-point number theoretic transform for all the polyphase sequences,
means of arranging the number theoretic transform output samples in M groups of K samples such that each group contains samples at the same position in the number theoretic transform outputs, taking one from each number theoretic transform output, and
means of producing M polynomials of degree K−1 by assigning samples in each group to coefficients of each polynomial in the order of the polyphase decomposition,
wherein arithmetic is performed on an integer residue ring.

25. A multiplexing system for transmitting subchannel signals over a communication channel, the system comprising:

a transmitter, including
means for receiving M subchannel signals $X_m(z)$ (m=0 to M−1) including K ordered positions, where K is greater than one,
a multiplexer that performs arithmetic on the finite field, the multiplexer including
means of extracting a sample from each of the K positions of each of the M subchannel signals,
means of arranging the MK samples in K groups of M samples such that each group contains samples corresponding to the same position in the order of K positions in the subchannel signals,
means of arranging the samples of each group in the order of subchannels, and computing M-point inverse of DFT-like transform on a finite field, of the arranged samples for all of the groups, and
means of producing MK-length signal by performing K-fold polyphase composition of the inverse of DFT-like transform outputs, and
means for transmitting the MK-length signal over the communication channel; and a receiver, including
means for receiving a receiver side multiplexed signal Y(z), including the MK-length signal transmitted from the transmitter, and
a demultiplexer that produces receiver side subchannel signals $Y_m(z)$ (m=0 to M−1), from the receiver side multiplexed signal Y(z), performing arithmetic on the finite field, the demultiplexer including
means of performing K-fold polyphase decomposition of the receiver side multiplexed signal, and producing K polyphase sequences of length M,
means of computing M-point DFT-like transform on a finite field, for all the polyphase sequences,
means of arranging the DFT-like transform output samples in M groups of K samples such that each group contains samples at the same position in the DFT-like transform outputs, taking one from each DFT-like transform output, and
means of producing M polynomials of degree K−1 by assigning samples in each group to coefficients of each polynomial in the order of the polyphase decomposition.

26. A multiplexing system for transmitting subchannel signals over a communication channel, the system comprising:

a transmitter, including
a terminal for receiving M subchannel signals $X_m(z)$ (m=0 to M−1) of length greater than one,
a multiplexing apparatus that is responsive to the received M subchannel signals $X_m(z)$ (m=0 to M−1) of length greater than one, to produces a multiplexed signal X(z), the multiplexing apparatus comprising means of obtaining a polynomial X(z) that satisfies $X(z) \equiv X_m(z) \bmod ((1-e^{j2\pi m/M}r_0 z^{-1})(1-e^{j2\pi m/M}r_1 z^{-1}) \ldots (1-e^{j2\pi m/M}r_{K-1} z^{-1}))$ (m=0 to M−1) wherein $r_i$ is a non-zero complex number (i=0 to K−1), and
means for transmitting the multiplexed signal X(z) over the communication channel; and a receiver, including
means for receiving a receiver side multiplexed signal Y(z), including the multiplexed signal X(z) transmitted from the transmitter, and
a demultiplexing apparatus that takes the receiver side multiplexed signal Y(z), and produces receiver side subchannel signals $Y_m(z)$ (m=0 to M−1), the demultiplexing apparatus comprising means of computing $Y_m(z) \equiv Y(z) \bmod ((1-e^{j2\pi m/M}r_0 z^{-1})(1-e^{j2\pi m/M}r_1 z^{-1}) \ldots (1-e^{j2\pi m/M}r_{K-1} z^{-1}))$ (m=0 to M−1), wherein $r_i$ is a non-zero complex number (i=0 to K−1).

27. A transmitter, comprising:

a terminal for receiving M subchannel signals $X_m(z)$ (m=0 to M−1) of length greater than one,
a multiplexing apparatus that is responsive to the received M subchannel signals $X_m(z)$ (m=0 to M−1) of length K where K is greater than one, the multiplexing apparatus including a Chinese remainder computation unit which obtains a polynomial $A(z)$ that satisfies $A(z) \equiv A_i(z) \bmod((1-e^{j2\pi(f+l)/t}r_0^{d/t}z^{-d/t})(1-e^{j2\pi(f+l)/t}r_1^{d/t}z^{-d/t}) \ldots (1-e^{j2\pi(f+l)/t}r_{K-1}^{d/t}z^{-d/t}))$ (l=0 to t−1) for given $A_i(z)$, wherein $r_i$ is a non-zero complex number (i=0 to K−1), and t is a positive integer that divides d, and means of obtaining $X(z)$ as a residue polynomial on $\bmod((1-r_0^M z^{-M})(1-r_1^M z^{-M}) \ldots (1-r_{K-1}^M z^{-M}))$ by applying the Chinese remainder computation unit recursively, starting with the subchannel signals $X_m(z)$ regarding them as residue polynomials on $\bmod((1e^{j2\pi m/M}r_0 z^{-1})(1-e^{j2\pi m/M}r_1 z^{-1}) \ldots (1-e^{j2\pi m/M}r_{K-1}z^{-1}))$ (m=0 to M−1); and means for transmitting the multiplexed signal $X(z)$.

28. A receiver, comprising means for receiving a receiver side multiplexed signal $Y(z)$, and a demultiplexing apparatus that takes the receiver side multiplexed signal $Y(z)$, and produces receiver side subchannel signals $Y_m(z)$ (m=0 to M−1), the demultiplexing apparatus including residue computation unit which computes $A_i(z) \equiv A(z) \bmod((1-e^{j2\pi(f+l)/t}r_0^{d/t}z^{-d/t})(1-e^{j2\pi(f+l)/t}r_1^{d/t}z^{-d/t}) \ldots (1-e^{j2\pi(f+l)/t}r_{K-1}^{d/t}z^{-d/t}))$ (l=0 to t−1) for a given polynomial $A(z)$, wherein $r_i$ is a non-zero complex number (i=0 to K−1), and t is a positive integer that divides d, and means of obtaining $Y_m(z)$ as a residue polynomial on $\bmod((1-e^{j2\pi m/M}r_0 z^{-1})(1-e^{j2\pi m/M}r_1 z^{-1}) \ldots (1-e^{j2\pi m/M}r_{K-1}z^{-1}))$ (m=0 to M−1) by applying the residue computation unit recursively, starting with the receiver side multiplexed signal $Y(z)$ regarding it as a residue polynomial on $\bmod((1-r_0^M z^{-M})(1-r_1^M z^{-M}) \ldots (1-r_{K-1}^M z^{-M}))$.

29. A multiplexing system for transmitting subchannel signals over a communication channel, the system comprising:

transmitter, including a terminal for receiving M subchannel signals $X_m(z)$ (m=0 to M−1) of length K where K greater than one, a multiplexing apparatus that is responsive to the received M subchannel signals $X_m(z)$ (m=0 to M−1) of length K, the multiplexing apparatus including a Chinese remainder computation unit which obtains a polynomial $A(z)$ that satisfies $A(z) \equiv A_i(z) \bmod((1-e^{j2\pi(f+l)/t}r_0^{d/t})(1-e^{j2\pi(f+l)/t}r_1^{d/t}z^{-d/t}) \ldots (1-e^{j2\pi(f+l)/t}r_{K-1}^{d/t}))$ (l=0 to t−1) for given $A_i(z)$, wherein $r_i$ is a non-zero complex number (i=0 to K−1), and t is a positive integer that divides d, and means of obtaining $X(z)$ as a residue polynomial on $\bmod((1-r_0^M z^{-M})(1-r_1^M z^{-M}) \ldots (1-r_{K-1}^M z^{-M}))$ by applying the Chinese remainder computation unit recursively, starting with the subchannel signals $X_m(z)$ regarding them as residue polynomials on $\bmod((1-e^{j2\pi m/M}r_0 z^{-1})(1-e^{j2\pi m/M}r_1 z^{-1}) \ldots (1-e^{j2\pi m/M}r_{K-1}z^{-1}))$(m=0 to M−1), and means for transmitting the multiplexed signal $X(z)$ over the communication channel; and a receiver, including means for receiving from the communication channel a receiver side multiplexed signal $Y(z)$, including the multiplexed signal $X(z)$, and a demultiplexing apparatus that takes the receiver side multiplexed signal $Y(z)$, and produces receiver side subchannel signals $Y_m(z)$ (m=0 to M−1), the demultiplexing apparatus including residue computation unit which computes $A_i(z) \equiv A(z) \bmod((1-e^{j2\pi(f+l)/t}r_0^{d/t}z^{-d/t})(1-e^{j2\pi(f+l)/t}r_1^{d/t}z^{-d/t}) \ldots (1-e^{j2\pi(f+l)/t}r_{K-1}^{d/t}z^{-d/t}))$ (l=0 to t−1) for a given polynomial $A(z)$, wherein $r_i$ is a non-zero complex number (i=0 to K−1), and t is a positive integer that divides d, and means of obtaining $Y_m(z)$ as a residue polynomial on $\bmod((1-e^{j2\pi m/M}r_0 z^{-1})(1-e^{j2\pi m/M}r_1 z^{-1}) \ldots (1-e^{j2\pi m/M}r_{K-1}z^{-1}))$ (m=0 to M−1) by applying the residue computation unit recursively, starting with the receiver side multiplexed signal $Y(z)$ regarding it as a residue polynomial on $\bmod((1-r_0^M z^{-M})(1-r_1^M z^{-M}) \ldots (1-r_{K-1}^M z^{-M}))$.

30. A transmitter, comprising:

a terminal for receiving M subchannel signals $X_m(z)$ (m=0 to M−1) of length K where K is greater than one, a multiplexing apparatus that is responsive to the received M subchannel signals $X_m(z)$ (m=0 to M−1) of length K, and produces a MK-length multiplexed signal $X(z)$ to be transmitted, the multiplexing apparatus including means of computing $V_i[m] \equiv X_m(z) \bmod(1e^{j2\pi m/M}r_i z^{-1})$ (i=0 to K−1, and m=0 to M−1), wherein $r_i$ is a non-zero complex number (i=0 to K−1), means of obtaining a polynomial $V_i(z)$ that satisfies $V_i(z) \equiv V_i[m] \bmod(1-e^{j2\pi m/M}r_i z^{-1})$ (m=0 to M−1, and i=0 to K−1), and means of obtaining $X(z)$ that satisfies $X(z) \equiv V_i(z) \bmod (1-r_i^M z^{-M})$ (i=0 to K−1); and means for transmitting the multiplexed signal $X(z)$.

31. A receiver, comprising:

means for receiving a receiver side multiplexed signal $Y(z)$; and a demultiplexing apparatus that takes the receiver side multiplexed signal $Y(z)$, and produces receiver side subchannel signals $Y_m(z)$, m=0, 1, ..., M−1, the demultiplexing apparatus including means of computing $U_i(z) \equiv Y(z) \bmod(1-r_i^M z^{-M})$ (i=0 to K−1), wherein $r_i$ is a non-zero complex number (i=0 to K−1), means of computing $U_i[m] \equiv U_i(z) \bmod(1-e^{j2\pi m/M}r_i z^{-1})$ (m=0 to M−1, and i=0 to K−1), and means of obtaining $Y_m(z)$ that satisfies $Y_m(z) \equiv U_i[m] \bmod(1-e^{j2\pi m/M}r_i z^{-1})$ (i=0 to K−1) (m=0 to M−1).

32. A multiplexing system for transmitting subchannel signals over a communication channel, the system comprising:

a transmitter, including a terminal for receiving M subchannel signals $X_m(z)$ (m=0 to M−1) of length K where K is greater than one, a multiplexing apparatus that is responsive to the received M subchannel signals $X_m(z)$ (m=0 to M−1) of length K, and produces a MK-length multiplexed signal $X(z)$ to be transmitted, the multiplexing apparatus including means of computing $V_i[m]X_m(z) \bmod(1-e^{j2\pi m/M}r_i z^{-1})$ (i=0 to K−1, and m=0 to M−1), wherein $r_i$ is a non-zero complex number (i=0 to K−1), means of obtaining a polynomial $V_i(z)$ that satisfies $V_i(z) \equiv V_i[m] \bmod(1-e^{j2\pi m/M}r_i z^{-1})$ (m=0 to M−1, and means of obtaining $X(z)$ that satisfies $X(z) \equiv V_i(z) \bmod(1-r_i^M z^{-M})$ (i=0 to K−1), and means for transmitting the multiplexed signal $X(z)$ over the communication channel; and a receiver, including
  means for receiving from the communication channel a receiver side multiplexed signal Y(z), including the transmitted multiplexed signal X(z), and
  a demultiplexing apparatus that takes the receiver side multiplexed signal Y(z), and produces receiver side subchannel signals $Y_m(z)$, m=0, 1, . . . , M−1, the demultiplexing apparatus including
    means of computing $U_i(z) \equiv Y(z) \bmod (1 - r_i^M z^{-M})$ (i=0 to K−1), wherein $r_i$ is a non-zero complex number (i=0 to K−1),
    means of computing $U_i[m] \equiv U_i(z) \bmod (1 - e^{j2\pi m/M} r_i z^{-1})$ (m=0 to M−1, and i=0 to K−1), and
    means of obtaining $Y_m(z)$ that satisfies $Y_m(z) \equiv U_i[m] \bmod (1 - e^{j2\pi m/M} r_i z^{-1})$ (i=0 to K−1) (m=0 to M−1).

33. A multiplexing system for transmitting subchannel signals over a communication channel, the system comprising:
  a transmitter, including
    a terminal for receiving M subchannel signals $X_m(z)$ (m=0 to M−1) of length greater than one,
    a multiplexing apparatus that is responsive to the received M subchannel signals $X_m(z)$ (m=0 to M−1) of length greater than one, to produces a multiplexed signal X(z), the multiplexing apparatus comprising means of obtaining a polynomial X(z) that satisfies $X(z) \equiv X_m(z) \bmod (P_m(z))$ (m=0 to M−1), wherein arithmetic is performed on a finite field and wherein $P_m(z)$ (m=0 to M−1) are relatively prime polynomials given by $(1 - \alpha^m \beta_0 z^{-1})(1 - \alpha^m \beta_1 z^{-1}) \ldots (1 - \alpha^m \beta_{K-1} z^{-1})$, where $\beta_i$ is a non-zero element (i=0 to K−1), and $\alpha$ is a primitive Mth root of unity in the finite field, and
    means for transmitting the multiplexed signal X(z) over the communication channel; and
  a receiver, including
    means for receiving from the communication channel a receiver side multiplexed signal Y(z), including the transmitted multiplexed signal X(z), and
    a demultiplexing apparatus that takes the receiver side multiplexed signal Y(z), and produces receiver side subchannel signals $Y_m(z)$ (m=0 to M−1), the demultiplexing apparatus comprising means of computing $Y_m(z) \equiv Y(z) \bmod (P_m(z))$ (m=0 to M−1), wherein arithmetic is performed on a finite field, and wherein $P_m(z)$ (m=0 to M−1) are relatively prime polynomials given by $(1 - \alpha^m \beta_0 z^{-1})(1 - \alpha^m \beta_1 z^{-1}) \ldots (1 - \alpha^m \beta_{K-1} z^{-1})$, where $\beta_i$ is a non-zero element (i=0 to K−1), and $\alpha$ is a primitive Mth root of unity in the finite field.

34. A transmitter, comprising:
a terminal for receiving M subchannel signals $X_m(z)$ (m=0 to M−1) of length greater than one,
a multiplexing apparatus that is responsive to the received M subchannel signals $X_m(z)$ (m=0 to M−1) of length K where K is greater than one, the multiplexing apparatus performing arithmetic on a finite field, and including
  a Chinese remainder computation unit which obtains a polynomial A(z) that satisfies $A(z) \equiv A_l(z) \bmod ((1 - e^{j2\pi(f+l)/t} \beta_0^{d/t} z^{-d/t})(1 - e^{j2\pi(f+l)/t} \beta_1^{d/t} z^{-d/t}) \ldots (1 - e^{j2\pi(f+l)/t} \beta_{K-1}^{d/t} z^{-d/t}))$ (l=0 to t−1) for given $A_l(z)$, wherein $\beta_i$ is a non-zero element (i=0 to K−1), and t is a positive integer that divides d, and
  means of obtaining X(z) as a residue polynomial on $\bmod((1 - \beta_0^M z^{-M})(1 - \beta_1^M z^{-M}) \ldots (1 - \beta_{K-1}^M z^{-M}))$ by applying the Chinese remainder computation unit recursively, starting with the subchannel signals $X_m(z)$ regarding them as residue polynomials on $\bmod((1 - \alpha^m \beta_0 z^{-1})(1 - \alpha^m \beta_1 z^{-1}) \ldots (1 - \alpha^m \beta_{K-1} z^{-1}))$ (m=0 to M−1), where $\alpha$ is a primitive Mth root of unity in the finite field; and
means for transmitting the multiplexed signal X(z).

35. A receiver, comprising
means for receiving a receiver side multiplexed signal Y(z), and
a demultiplexing apparatus that takes the receiver side multiplexed signal Y(z), and produces receiver side subchannel signals $Y_m(z)$ (m=0 to M−1), the demultiplexing apparatus including
  residue computation unit which computes $A_l(z) \equiv A(z) \bmod ((1 - e^{j2\pi(f+l)/t} \beta_0^{d/t} z^{-d/t})(1 - e^{j2\pi(f+l)/t} \beta_1^{d/t} z^{-d/t}) \ldots (1 - e^{j2\pi(f+l)/t} \beta_{K-1}^{d/t} z^{-d/t}))$ (l=0 to t−1) for a given polynomial A(z), wherein $\beta_i$ is a non-zero element (i=0 to K−1), and t is a positive integer that divides d, and
  means of obtaining $Y_m(z)$ as a residue polynomial on $\bmod((1 - \alpha^m \beta_0 z^{-1})(1 - \alpha^m \beta_1 z^{-1}) \ldots (1 - \alpha^m \beta_{K-1} z^{-1}))$ (m=0 to M+1), wherein $\alpha$ is a primitive Mth root of unity in the finite field, by applying the residue computation unit recursively, starting with the receiver side multiplexed signal Y(z) regarding it as a residue polynomial on $\bmod((1 - \beta_0^M z^{-m})(1 - \beta_1^M z^{-M}) \ldots (1 - \beta_{K-1}^M z^{-M}))$.

36. A multiplexing system for transmitting subchannel signals over a communication channel, the system comprising:
  transmitter, including
    a terminal for receiving M subchannel signals $X_m(z)$ (m=0 to M−1) of length greater than one,
    a multiplexing apparatus that is responsive to the received M subchannel signals $X_m(z)$ (m=0 to M−1) of length K where K is greater than one, the multiplexing apparatus performing arithmetic on a finite field, and including
      a Chinese remainder computation unit which obtains a polynomial A(z) that satisfies $A(z) \equiv A_l(z) \bmod ((1 - e^{j2\pi(f+l)/t} \beta_0^{d/t} z^{-d/t})(1 - e^{j2\pi(f+l)/t} \beta_1^{d/t} z^{-d/t}) \ldots (1 - e^{j2\pi(f+l)/t} \beta_{K-1}^{d/t} z^{-d/t}))$ (l=0 to t−1) for given $A_l(z)$, wherein $\beta_i$ is a non-zero element (i=0 to K−1), and t is a positive integer that divides d, and
      means of obtaining X(z) as a residue polynomial on $\bmod((1 - \beta_0^M z^{-M})(1 - \beta_1^M z^{-M}) \ldots (1 - \beta_{K-1}^M z^{-M}))$ by applying the Chinese remainder computation unit recursively, starting with the subchannel signals $X_m(z)$ regarding them as residue polynomials on $\bmod((1 - \alpha^m \beta_0 z^{-1})(1 - \alpha^m \beta_1 z^{-1}) \ldots (1 - \alpha^m \beta_{K-1} z^{-1}))$ (m=0 to M−1), where $\alpha$ is a primitive Mth root of unity in the finite field, and
    means for transmitting the multiplexed signal X(z) over a communication channel; and
  a receiver, including
    means for receiving a receiver side multiplexed signal Y(z), including the multiplexed signal X(z), from the communication channel, and
    a demultiplexing apparatus that takes the receiver side multiplexed signal Y(z), and produces receiver side subchannel signals $Y_m(z)$ (m=0 to M−1), the demultiplexing apparatus including
      residue computation unit which computes $A_l(z) \equiv A(z) \bmod ((1 - e^{j2\pi(f+l)/t} \beta_0^{d/t} z^{-d/t})(1 - e^{j2\pi(f+l)/t} \beta_1^{d/t} z^{-d/t}) \ldots (1 - e^{j2\pi(f+l)/t} \beta_{K-1}^{d/z} z^{-d/t}))$ (l=0 to t−1) for a given polynomial A(z), wherein $\beta_i$ is a non-zero element (i=0 to K−1), and t is a positive integer that divides d, and means of obtaining $Y_m(z)$ as a residue polynomial on $\mod((1-\alpha^m\beta_0 z^{-1})(1-\alpha^m\beta_1 z^{-1}) \ldots (1-\alpha^m\beta_{K-1} z^{-1}))$ ((m=0 to M−1), wherein $\alpha$ is a primitive Mth root of unity in the finite field, by applying the residue computation unit recursively, starting with the receiver side multiplexed signal Y(z) regarding it as a residue polynomial on $\mod((1-\beta_0^M z^{-M})(1-\beta_1^M z^{-M}) \ldots (1-\beta_{K-1}^M z^{-M}))$.

37. A transmitter, comprising:

a terminal for receiving M subchannel signals $X_m(z)$ (m=0 to M−1) of length K where K is greater than one, a multiplexing apparatus that performs arithmetic on a finite field and is responsive to the received M subchannel signals $X_m(z)$ (m=0 to M−1) of length K, to produce a MK-length multiplexed signal X(z), the multiplexing apparatus including means of computing $V_i[m] \equiv X_m(z) \mod(1-\alpha^{m/M}\beta_i z^{-1})$ (i=0 to K−1, and m=0 to M−1), where $\beta_i$ is a non-zero element (i=0 to K−1), means of obtaining a polynomial $V_i(z)$ that satisfies $V_i(z) \equiv V_i[m] \mod(1-\alpha^{m/M}\beta_i z^{-1})$ (m=0 to M−1, and i=0 to K−1), where $\alpha$ is a primitive Mth root of unity in the finite field, and means of obtaining X(z) that satisfies $X(z) \equiv V_i(z) \mod(1-\beta_i^M z^{-M})$ (i=0 to K−1); and means for transmitting the multiplexed signal X(z).

38. A receiver, comprising:

means for receiving a receiver side multiplexed signal Y(z); and a demultiplexing apparatus that performs arithmetic on a finite field and takes the receiver side multiplexed signal Y(z), and produces receiver side subchannel signals $Y_m(z)$, m=0, 1, . . . , M−1, the demultiplexing apparatus including means of computing $U_i(z) \equiv Y(z) \mod(1-\beta_i^M z^{-M})$ (i=0 to K−1), wherein $\beta_i$ is a non-zero element (i=0 to K−1), means of computing $U_i[m] \equiv U_i(z) \mod(1-\alpha^{m/M}\beta_i z^{-1})$ (m=0 to M−1, and i=0 to K−1), where $\alpha$ is a primitive Mth root of unity in the finite field, and means of obtaining $Y_m(z)$ that satisfies $Y_m(z) \equiv U_i[m] \mod(1-\alpha^{m/M}\beta_i z^{-1})$ (i=0 to K−1) (m=0 to M−1).

39. A multiplexing system for transmitting subchannel signals over a communication channel, the system comprising:

a transmitter, including a terminal for receiving M subchannel signals $X_m(z)$ (m=0 to M−1) of length K where K is greater than one, a multiplexing apparatus that performs arithmetic on a finite field and is responsive to the received M subchannel signals $X_m(z)$ (m=0 to M−1) of length K, to produce a MK-length multiplexed signal X(z), the multiplexing apparatus including means of computing $V_i[m] \equiv X_m(z) \mod(1-\alpha^{m/M}\beta_i z^{-1})$ (i=0 to K−1, and m=0 to M−1), where $\beta_i$ is a non-zero element (i=0 to K−1), means of obtaining a polynomial $V_i(z)$ that satisfies $V_i(z) \equiv V_i[m] \mod(1-\alpha^{m/M}\beta_i z^{-1})$ (m=0 to M−1, and i=0 to K−1), where $\alpha$ is a primitive Mth root of unity in the finite field, and means of obtaining X(z) that satisfies $X(z) \equiv V_i(z) \mod(1-\beta_i^M z^{-M})$ (i=0 to K−1), and means for transmitting the multiplexed signal X(z) over the communication channel; and a receiver, including means for receiving a receiver side multiplexed signal Y(z), including the multiplexed signal X(z), from the communication channel, and p2 a demultiplexing apparatus that performs arithmetic on a finite field and takes the receiver side multiplexed signal Y(z), and produces receiver side subchannel signals $Y_m(z)$, m=0, 1, . . . , M−1, the demultiplexing apparatus including means of computing $U_i(z) \equiv Y(z) \mod(1-\beta_i^M z^{-M})$ (i=0 to K−1), wherein $\beta_i$ is a non-zero element (i=0 to K−1), means of computing $U_i[m] \equiv U_i(z) \mod(1-\alpha^{m/M}\beta_i z^{-1})$ (m=0 to M−1, and i=0 to K−1), where $\alpha$ is a primitive Mth root of unity in the finite field, and means of obtaining $Y_m(z)$ that satisfies $Y_m(z) \equiv U_i[m] \mod(1-\alpha^{m/M}\beta_i z^{-1})$ (i=0 to K−1) (m=0 to M−1).

40. A multiplexing apparatus that takes M subchannel signals $X_m(z)$ (m=0 to M−1) each including K ordered positions, where K is greater than one, and produces a MK-length multiplexed signal X(z) to be transmitted, the multiplexing apparatus comprising:

means of extracting a sample from each of the K positions of each of the M subchannel signals;

means of arranging the MK samples in K groups of M samples such that each group contains samples corresponding to the same position in the order of K positions in the subchannel signals;

means of arranging the samples of each group in the order of subchannels, and computing M-point inverse DFT of the arranged samples for all of the groups; and means of producing an MK-length signal by performing K-fold polyphase composition of the inverse DFT outputs.

41. The multiplexing apparatus of claim 40, in which arithmetic is performed on an integer residue ring, and the inverse DFT is replaced by the inverse number theoretic transform.

42. A multiplexing apparatus as described in claim 40, in which arithmetic is performed on a finite field, and the inverse DFT is replaced by the inverse of DFT-like transform on the finite field.

* * * * *